(12) United States Patent
Hanaoka

(10) Patent No.: US 11,500,134 B2
(45) Date of Patent: *Nov. 15, 2022

(54) OPTICAL DIAPHRAGM DEVICE, LENS BARREL AND IMAGING DEVICE OR PROJECTION DEVICE

(71) Applicant: Nittoh Inc., Nagano (JP)

(72) Inventor: Takafumi Hanaoka, Nagano (JP)

(73) Assignee: NITTOH INC., Nagano (JP)

( * ) Notice: Subject to any disclaimer, the term of this patent is extended or adjusted under 35 U.S.C. 154(b) by 268 days.

This patent is subject to a terminal disclaimer.

(21) Appl. No.: 16/955,049

(22) PCT Filed: Dec. 5, 2018

(86) PCT No.: PCT/JP2018/044646
§ 371 (c)(1),
(2) Date: Jun. 18, 2020

(87) PCT Pub. No.: WO2019/124071
PCT Pub. Date: Jun. 27, 2019

(65) Prior Publication Data
US 2020/0379148 A1 Dec. 3, 2020

(30) Foreign Application Priority Data
Dec. 21, 2017 (JP) .............................. JP2017-244881

(51) Int. Cl.
*G02B 5/00* (2006.01)
*G03B 9/06* (2021.01)

(52) U.S. Cl.
CPC .............. *G02B 5/005* (2013.01); *G03B 9/06* (2013.01)

(58) Field of Classification Search
CPC ................................. G03B 9/06; G02B 5/005
See application file for complete search history.

(56) References Cited

U.S. PATENT DOCUMENTS

| 10,884,317 | B2 * | 1/2021 | Hanaoka | ................... G03B 9/06 |
| 2018/0180971 | A1 * | 6/2018 | Yoshizawa | ............... G03B 9/06 |
| 2019/0179211 | A1 * | 6/2019 | Endo | ...................... G02B 5/005 |

FOREIGN PATENT DOCUMENTS

| EP | 3477373 A1 | 5/2019 |
| EP | 3553599 A1 | 10/2019 |

(Continued)

OTHER PUBLICATIONS

International Search Report in PCT/JP2018/044646, dated Mar. 12, 2019. 2pp.

(Continued)

*Primary Examiner* — Christopher E Mahoney
(74) *Attorney, Agent, or Firm* — Hauptman Ham, LLP

(57) ABSTRACT

An optical diaphragm device includes: diaphragm blades each including a first fixing boss and a moving boss protruding from the other surface of a first planar plate toward a side in a second direction; light leakage prevention blades each having a second fixing boss and forming a pair with the diaphragm blade; a drive ring on which first cam grooves are formed; and a housing body capable of housing the diaphragm blades, the light leakage prevention blades, and the drive ring. A second cam groove is further formed in the light leakage prevention blade, the moving boss of the diaphragm blade is inserted into the second cam groove of the light leakage prevention blade, and is inserted into the first cam groove of the drive ring. The light leakage prevention blade has a light leakage prevention blade extending portion which extends toward the other side from the second fixing boss.

9 Claims, 15 Drawing Sheets

(56) References Cited

FOREIGN PATENT DOCUMENTS

| | | |
|---|---|---|
| JP | S4326691 B1 | 11/1968 |
| JP | H5113591 A | 5/1993 |
| JP | 2011215319 A | 10/2011 |

OTHER PUBLICATIONS

Extended European Search Report in EP Application No. 18891884.
1, dated Jun. 15, 2021. 8pp.

* cited by examiner

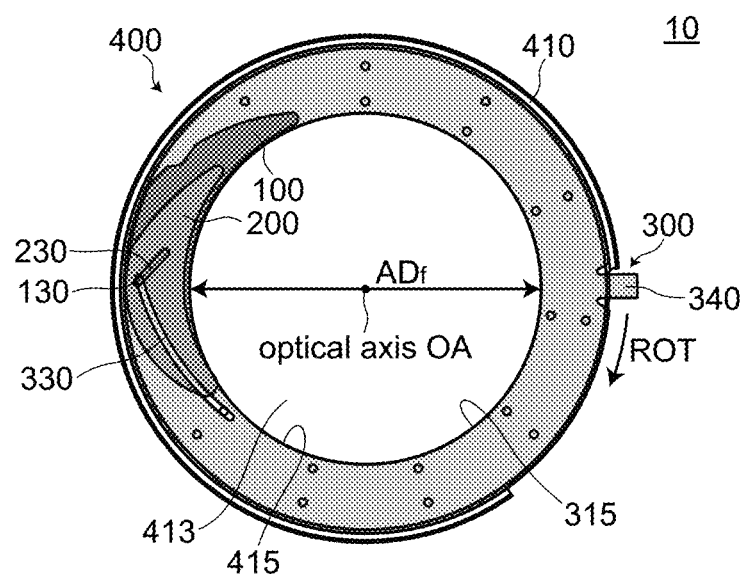
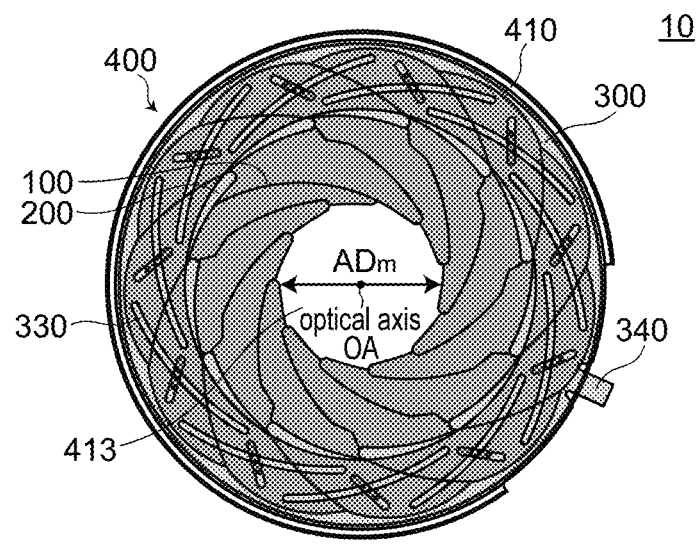
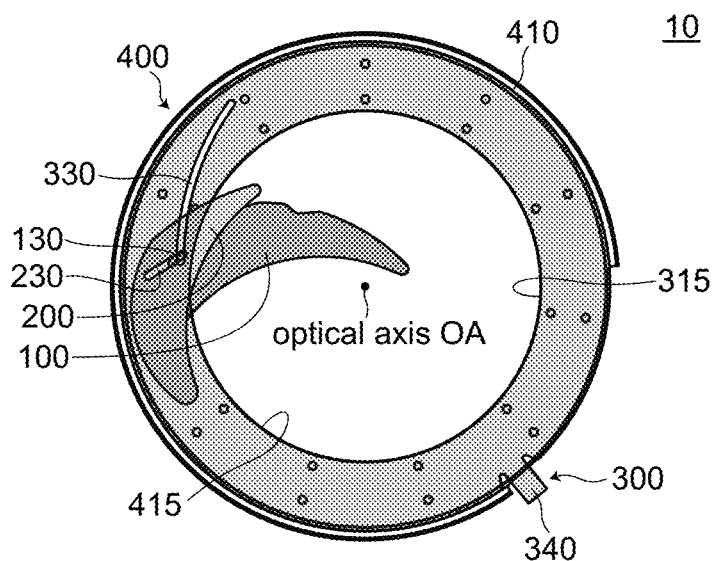

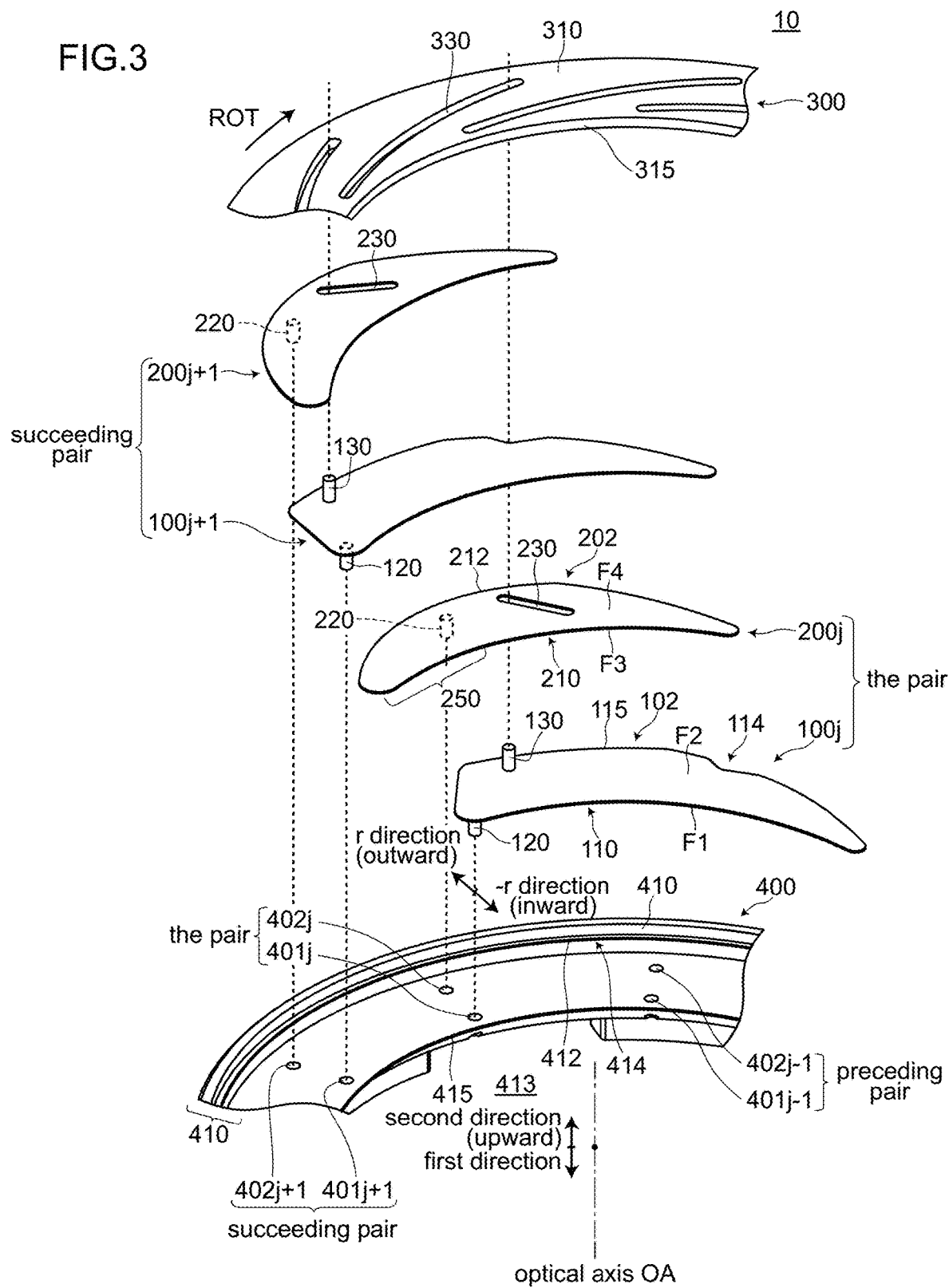

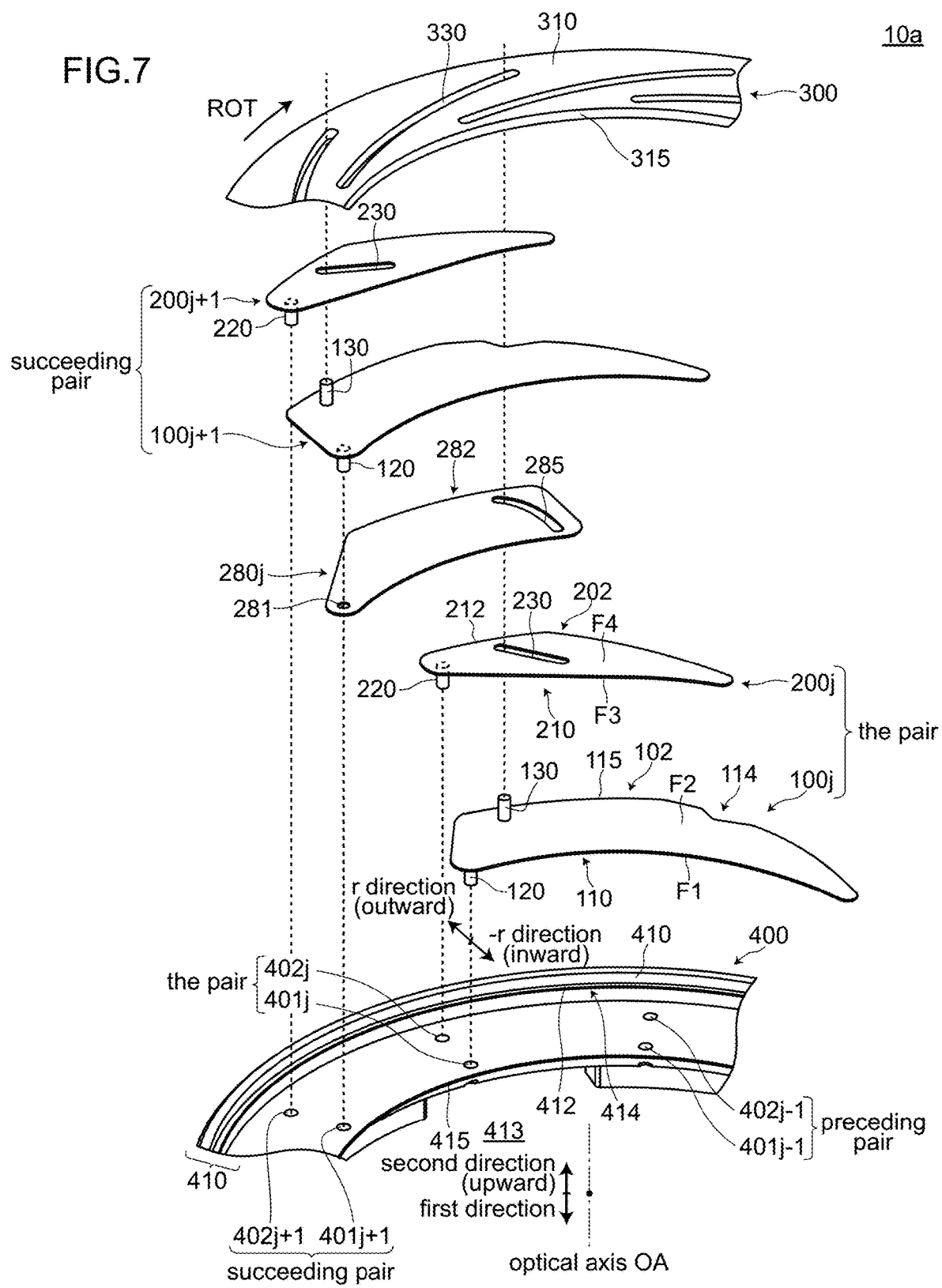

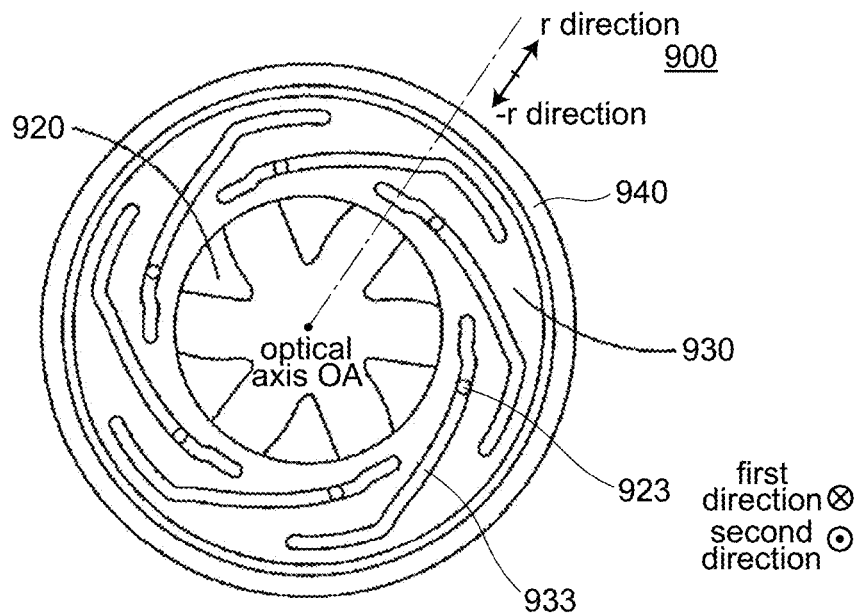
FIG.14A
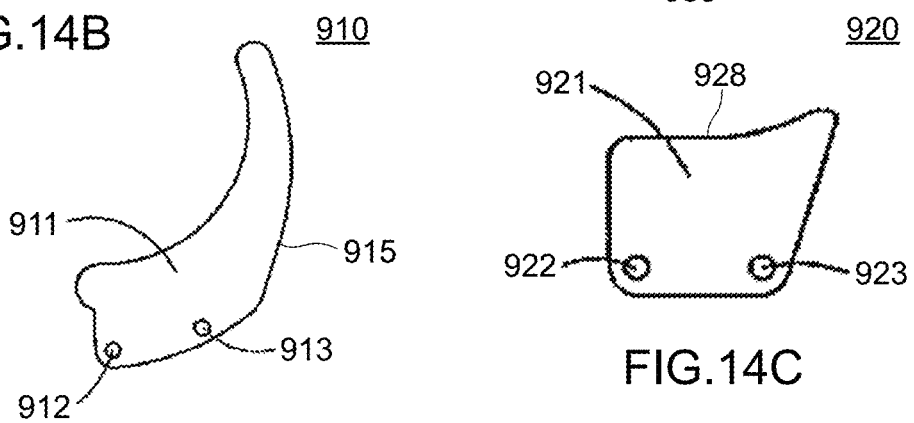
FIG.14B
FIG.14C
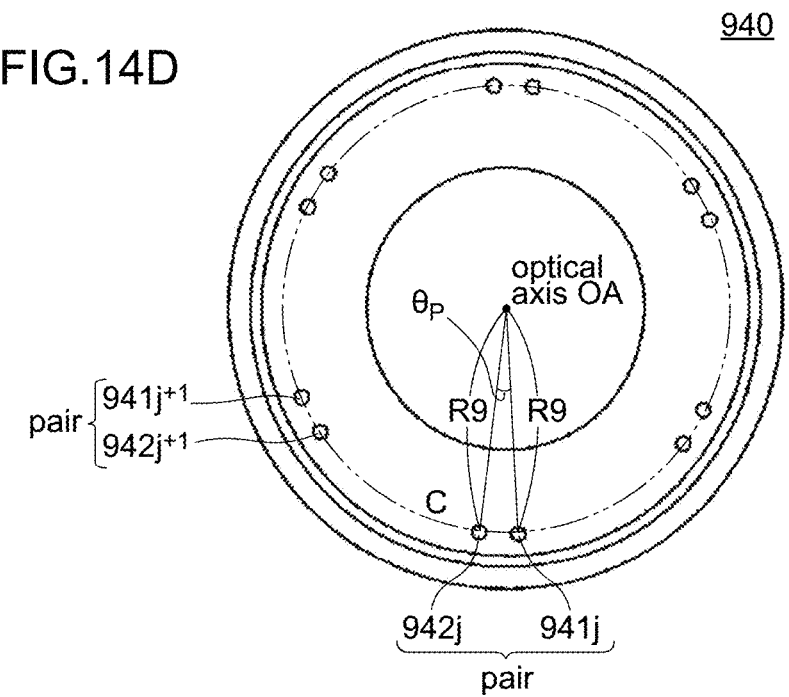
FIG.14D

OPTICAL DIAPHRAGM DEVICE, LENS BARREL AND IMAGING DEVICE OR PROJECTION DEVICE

RELATED APPLICATIONS

The present Application is a National phase of International Application number PCT/JP2018/044646, filed Dec. 5, 2018, and claims priority to Japanese Application number 2017-244881, filed Dec. 21, 2017.

TECHNICAL FIELD

The present invention relates to an optical diaphragm device, a lens barrel and an imaging device or a projection device.

BACKGROUND ART

In an imaging device such as a camera, an optical diaphragm device is used for adjusting an amount of light from an imaging object which is incident on an imaging plane. The optical diaphragm device includes a circular ring-like housing body. When an aperture diameter of a diaphragm aperture becomes maximum (fully open), diaphragm blades are retracted within a width of the housing body. Accordingly, with respect to a width of the housing body, it is necessary to ensure at least a width equal to or more than a width of the diaphragm blade as a retraction space for the diaphragm blades.

To narrow such a retraction space for the diaphragm blades for realizing downsizing of the optical diaphragm device, there has been conventionally made an attempt to narrow a width per se of the diaphragm blade (narrowing of a width of the diaphragm blade).

However, it is also known that when narrowing of the width of the diaphragm blade progresses, there arises a drawback that light easily leaks at a portion other than the diaphragm aperture.

To overcome such a drawback of leakage of light, there has been conventionally known an optical diaphragm device where light leakage prevention blades are introduced in addition to diaphragm blades and a gap which causes leakage of light is shielded by the light leakage prevention blades (see patent literature 1, for example).

FIG. 14A to FIG. 14D are views for describing a conventional optical diaphragm device 900. FIG. 14A is a plan view of the optical diaphragm device 900 as viewed in a plan view along an optical axis OA. In FIG. 14A, only a state where light leakage prevention blades 920 protrude is shown, and the illustration of diaphragm blades 910 is omitted. FIG. 14B is a plan view showing the diaphragm blade 910, and FIG. 14C is a plan view showing the light leakage prevention blade 920, and FIG. 14D is a plan view showing a housing body 940.

As shown in FIG. 14A to FIG. 14D, the conventional optical diaphragm device 900 is an optical diaphragm device 900 for changing an aperture diameter of a diaphragm aperture by advancing or retracting a plurality of blades with respect to the optical axis OA. The optical diaphragm device 900 includes: a plurality of diaphragm blades 910 each having a diaphragm blade body 911, a diaphragm blade fixing boss 912 protruding from one surface of the diaphragm blade body 911 toward a side in a first direction along the optical axis OA, and a diaphragm blade moving boss 913 protruding from the other surface of the diaphragm blade body 911 toward a side in a second direction opposite to the first direction; a plurality of light leakage prevention blades 920 each forming a pair with each of the above-mentioned diaphragm blades 910, each light leakage prevention blade 920 having a light leakage prevention blade body 921, a light leakage prevention blade fixing boss 922 protruding from one surface of the light leakage prevention blade body 921 toward the side in the first direction, and a light leakage prevention blade moving boss 923 protruding from the other surface of the light leakage prevention blade body 921 toward the side in the second direction; a drive ring 930 having cam grooves 933 into each of which the moving boss is inserted, wherein a distance between the cam groove 933 and the optical axis OA differs corresponding to a position of the cam groove 933, and the cam groove 933 is movable in a circumferential direction about the optical axis OA due to rotation of the drive ring 930 about the optical axis OA; and a housing body 940 housing the diaphragm blades 910, the light leakage prevention blades 920, and the drive ring 930. The optical diaphragm device 900 includes a plurality of pairs each consisting of the diaphragm blade 910 and the light leakage prevention blade 920 (six pairs in the conventional optical diaphragm device 900 shown in FIG. 14A to FIG. 14D). The cam grooves 933 are formed in the drive ring 930. The number of cam grooves 933 corresponds to the number of pairs each consisting of the diaphragm blade 910 and the light leakage prevention blade 920. A plurality of pairs each consisting of a first hole 941*j* and a second hole 942*j* are formed in the housing body 940 corresponding to the plurality of pairs each consisting of the diaphragm blade 910 and the light leakage prevention blade 920. The diaphragm blade fixing boss 912 and the light leakage prevention blade fixing boss 922 are inserted into the pair of the first hole 941*j* and the second hole 942*j* respectively. The number of pairs each consisting of the first hole 941*j* and the second hole 942*j* corresponds to the number of pairs each consisting of the diaphragm blade and the light leakage prevention blade. With respect to the diaphragm blade 910 and the light leakage prevention blade 920 which form, the stacked pair, the diaphragm blade moving boss 913 and the light leakage prevention blade moving boss 923 are respectively inserted into one cam groove 933 (j: an integer of 1 or more).

According to the conventional optical diaphragm device 900, the light leakage prevention blades 920 can be added while using the existing basic structure for driving the diaphragm blades (the housing body, the drive ring and the like) without modification and hence, leakage of light brought about by narrowing of a width of the diaphragm blade can be prevented.

CITATION LIST

Patent Literature

PTL 1: JP 5-113591 A

SUMMARY OF INVENTION

Technical Problem (1) However, the conventional optical diaphragm device 900 adopts the structure where the diaphragm blade moving boss 913 and the light leakage prevention blade moving boss 923 are respectively inserted into one cam groove 933. With such a structure, two kinds of blades (the diaphragm blade 910 and the light leakage prevention blade 920) are driven by one cam, groove 933. Accordingly, as a length of the cam groove 933, a length for driving the light leakage prevention blade 920 also becomes necessary in addition to a length for driving the diaphragm blade 910.

That is, it is necessary that the cam groove 933 is formed of a groove portion for driving the diaphragm blade 910 and a groove portion for driving the light leakage prevention blade 920. Accordingly, the cam groove 933 becomes necessary where the cam groove 933 has a long total length compared to the configuration where the cam groove 933 is formed of only the groove for driving only either one of the blades.

As described above, in the conventional optical diaphragm device 900, two kinds of blades are driven by one cam groove and hence, the long cam groove becomes necessary. Accordingly, it is difficult to increase the number of cam grooves formed in a limited space of the drive ring 930 and hence, it is difficult to increase the number of diaphragm blades.

(2) In general, in the optical diaphragm device, with respect to a plurality of pairs each formed of the diaphragm blade and the light leakage prevention blade, the fixing bosses which the respective blades have are inserted into the corresponding holes formed in the housing body, and the diaphragm blades and the light leakage prevention blades are housed in the housing body in a sequentially overlapping manner.

For example, in the conventional optical diaphragm device 900, the diaphragm blade 910$j$ out of "the diaphragm blade 910$j$ and the light leakage prevention blade 920$j$ which form the pair", the light leakage prevention blade 920$j$ out of "the diaphragm blade 910$j$ and the light leakage prevention blade 920$j$ which form the pair", the diaphragm blade 910$j$+1 out of "the diaphragm blade 910$j$+1 and the light leakage prevention blade 920$j$+1 which form the succeeding pair" positioned adjacently to the diaphragm blade 910$j$ and the light leakage prevention blade 920$j$ which form the pair, and the light leakage prevention blade 920$j$+1 out of "the diaphragm blade 910$j$+1 and the light leakage prevention blade 920$j$+1 which form the succeeding pair" are arranged in an overlapping manner in the upward direction in this order (see FIG. 14D, a state where the blades overlap with each other not shown in the drawing) "second direction" is defined as an upward direction, and "first direction" is defined as a downward direction.

However, in the conventional optical diaphragm device 900, in a process of decreasing or increasing the aperture diameter of the diaphragm aperture (a process of adjusting the aperture), depending on a case, there arises a drawback that the overlapping order of the diaphragm blade 910 and the light leakage prevention blade 920 collapses so that the overlapping order of these blades cannot be maintained.

FIG. 15 is a plan view for describing one example of the conventional optical diaphragm device 900 where the overlapping order of the diaphragm blade 910 and the light leakage prevention blade 920 collapses. In FIG. 15, both the diaphragm blade 910$j$ and the light leakage prevention blade 920$j$ which form the pair and the diaphragm blade 910$j$+1 out of the diaphragm blade 910$j$+1 and the light leakage prevention blade 920$j$+1 which form the succeeding pair positioned adjacently to the diaphragm blade 910$j$ and the light leakage prevention blade 920$j$ which form the pair are shown. Other blades are omitted from the drawing.

In the conventional optical diaphragm device 900, for example, as shown in FIG. 15, there may be a case where the diaphragm blade 910$j$+1 which should overlap with the light leakage prevention blade 920$j$ from above originally falls out from the light leakage prevention blade 920$j$ in a process of adjusting the aperture, and the diaphragm blade 910$j$+1 and the tight leakage prevention blade 920$j$ are disposed on the same stage. Such a state is one of states where the overlapping order of the diaphragm blade and the light leakage prevention blade collapses so that the overlapping order of these blades cannot be maintained.

When the diaphragm blades and the light leakage prevention blades are operated in an attempt to further increase the aperture diameter from this state, for example, a portion of an outer profile 915 of the diaphragm blade 910$j$+1 is brought into contact with an inner periphery 923 of the light leakage prevention blade 920$j$ thus giving rise to a drawback that the smooth movement of the blades is obstructed. Further, depending on a case, the diaphragm blade 910$j$+1 sinks below the light leakage prevention blade 920$j$ and hence, the overlapping order of the blades is exchanged. When an operation is performed in an attempt to further increase the aperture diameter from such a state, there also arises a possibility that the outer profile 915 of the diaphragm blade 910$j$+1 hits the light leakage prevention blade fixing boss 922 of the light leakage prevention blade 920$j$.

The present invention has been made in view of the above-mentioned circumstances, and it is art object of the present invention to provide an optical diaphragm device capable of easily increasing the number of diaphragm blades and also capable of maintaining the overlapping order of the diaphragm blade and a light leakage prevention blade.

Solution to Problem

[1] A first optical diaphragm device according to the present invention is an optical diaphragm device capable of changing an aperture diameter of a diaphragm aperture by advancing or retracting a plurality of blades with respect to an optical axis, the optical diaphragm device including: a plurality of diaphragm blades each including: a first blade portion which is formed of a first planar plate and shields light incident on the aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction; a plurality light leakage prevention blades each including; a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade; a drive ring having a plurality of first cam grooves into each of which the moving boss is inserted, wherein a distance between the first cam groove and the optical axis differs corresponding to a position of the first cam groove in a circumferential direction, and the first cam groove is movable in the circumferential direction about the optical axis due to rotation of the drive ring about the optical axis; and a housing body capable of housing the diaphragm blades, the light leakage prevention blades, and the drive ring, wherein the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the first fixing boss and the second fixing boss being inserted into the pair of the first hole and the second hole respectively, the number of pairs each consisting of the first hole and the second hole being equal to the number of pairs each consisting of the diaphragm blade and the light leakage prevention blade, a second cam groove is further formed in the light leakage prevention blade, the moving boss of the diaphragm blade is inserted into the second cam groove of the light leakage prevention blade, and is inserted into the first cam groove of the drive ring, and assuming a side where the second blade portion of the second planar plate of the light leakage prevention blade is positioned as viewed from the second fixing boss as one side, the light leakage prevention blade further has a light leakage prevention blade extending portion which extends toward the other side from the second fixing boss.

According to the first optical diaphragm device of the present invention, the second cam groove is further formed in the light leakage prevention blade, the moving boss of the diaphragm blade is inserted into the second cam groove of the light leakage prevention blade and the first cam groove of the drive ring. Accordingly, when the drive ring is rotated, a force acts on the moving boss of the diaphragm blade through the first cam groove of the drive ring, and the first blade portion of the diaphragm blade is rotated using the first fixing boss as a fulcrum (rotary shaft). At the same time, along with the movement of the moving boss along the first cam groove, a force acts on the second cam groove of the light leakage prevention blade through the moving boss, and the second blade portion of the light leakage prevention blade is rotated using the second fixing boss as a fulcrum (rotary shaft). In this manner, although the boss which is inserted into the first cam groove of the drive ring is only the moving boss of the diaphragm blade, the light leakage prevention blade can also be driven in an interlocking manner in a process where the diaphragm blade is driven.

According to such a first optical diaphragm device, it is unnecessary to form a cam groove pattern for driving the light leakage prevention blade on the first cam groove. Accordingly, a length of the first cam groove can be set shorter than a length of a cam groove in a conventional optical diaphragm device by an amount that the formation of the cam groove pattern becomes unnecessary. Since the length of the first cam groove can be shortened, the number of first cam grooves formed in the drive ring can be easily increased. Further, it is unnecessary to form a cam groove exclusively used for driving the light leakage prevention blade in the drive ring and hence, it is sufficient to form only the first cam groove for driving the diaphragm blade in the drive ring. Accordingly, it is possible to reduce the number of restrictions in terms of a space which are imposed on forming the first cam groove in the drive ring and hence, the degree of freedom in designing the shape of the first cam groove can be increased. In this manner, according to the first optical diaphragm device of the present invention, it is possible to provide the optical diaphragm device where the number of diaphragm blades can be easily increased.

The second optical diaphragm device of the present invention described later in [4] acquires substantially the same manner of operation and advantageous effects described above. Accordingly, the description of the manner of operation and the advantageous effect in this paragraph is used in the same manner in a paragraph for describing the manner of operation and the advantageous effect of [2] described later.

In the first optical diaphragm device of the present invention, assuming the side where the second blade portion of the second planar plate of the light leakage prevention blade is positioned as viewed from the second fixing boss as one side, the light leakage prevention blade further has the light leakage prevention blade extending portion which extends toward the other side from the second fixing boss.

Accordingly, over the entire process of adjusting the aperture, it is possible to allow the light leakage prevention blade extending portion of the light leakage prevention blade and the diaphragm blade disposed adjacently to and overlapping with the light leakage prevention blade to continue such an overlapping state while maintaining the overlapping order. Accordingly, it is possible to prevent the occurrence of a case where the diaphragm blade falls out from the light leakage prevention blade and is disposed on the same stage as the light leakage prevention blade or the occurrence of a case where the diaphragm blade sinks below the light leakage prevention blade thus causing an exchange of the overlapping order of the blades.

With such a configuration, the first optical diaphragm device according to the present invention can maintain the overlapping order of the diaphragm blade and the light leakage prevention blade.

[2] In the first optical diaphragm device of the present invention, it is preferable that, assuming that the second direction is defined as an upward direction, the diaphragm blade out of the diaphragm blade and the light leakage prevention blade which form the pair, the light leakage prevention blade out of the diaphragm blade and the light leakage prevention blade which form the pair, the diaphragm blade out of the diaphragm blade and the light leakage prevention blade which form the succeeding pair positioned adjacently to the diaphragm blade and the light leakage prevention blade which form the pair, and the light leakage prevention blade out of the diaphragm blade and the light leakage prevention blade which form the succeeding pair be arranged in an overlapping manner in the upward direction in this order. It is also preferable that, in viewing the optical diaphragm device along the optical axis, a portion of an outer profile of the diaphragm blade out of the diaphragm blade and the light leakage prevention blade which form the succeeding pair always overlap with the light leakage prevention blade out of the diaphragm blade and the light leakage prevention blade which form the pair, and in a state where the aperture diameter of the diaphragm aperture assumes a minimum value, a portion of the outer profile of the diaphragm blade out of the diaphragm blade and the light leakage prevention blade which form the succeeding pair overlap with the light leakage prevention blade extending portion of the light leakage prevention blade out of the diaphragm blade and the light leakage prevention blade which form the pair.

In the first optical diaphragm device of the present invention, the portion of the outer profile of the diaphragm blade out of the diaphragm blade and the light leakage prevention blade which form the succeeding pair always overlaps with the light leakage prevention blade out of the diaphragm blade and the light leakage prevention blade which form the pair. Accordingly, the outer profile of the diaphragm blade falls within a range of the light leakage prevention blade and hence, it is possible to prevent the occurrence of a case where the diaphragm blade falls out from the light leakage prevention blade and is disposed on the same stage as the light leakage prevention blade or the occurrence of a case where the diaphragm blade sinks below the light leakage prevention blade thus causing an exchange of the overlapping order of the blades.

Further, even in a case where the aperture diameter of the diaphragm aperture assumes a minimum value which is a state where the order of the blades is most likely to exchange, in the first optical diaphragm device of the present invention, the portion of the outer profile of the diaphragm blade out of the diaphragm blade and the light leakage prevention blade which form the succeeding pair overlaps with the light leakage prevention blade extending portion of the light leakage prevention blade out of the diaphragm blade and the light leakage prevention blade which form the pair. Accordingly, the outer profile of the diaphragm blade falls within a range of the light leakage prevention blade extending portion of the light leakage prevention blade and hence, it is possible to prevent the occurrence of a case where the diaphragm blade falls out from the light leakage prevention blade and is disposed on the same stage as the light leakage prevention blade or the occurrence of a case where the diaphragm blade sinks below the light leakage prevention blade thus causing an exchange of the overlapping order of the blades.

With such a configuration, the first optical diaphragm device according to the present invention can maintain the overlapping order of diaphragm blade and light leakage prevention blade.

[3] In the first optical diaphragm device of the present invention, it is preferable that the diaphragm blade be formed of the first planar plate of an elongated shape having a longitudinal axis as a whole, the first fixing boss be formed on one side of the first planar plate of the diaphragm blade in the longitudinal axis direction and a diaphragm blade extending portion be formed on the other side of the fir planar plate of the diaphragm blade in the longitudinal axis direction, the diaphragm blade extending portion have an inner periphery formed in a shape substantially equal to a shape of a portion of the diaphragm aperture in a state where the aperture diameter of the diaphragm aperture assumes a maximum value, a portion of the diaphragm blade extending portion which is formed to be disposed on a more outer peripheral side than at least the inner periphery be always positioned outside a housing body inner periphery which is an inner periphery of the housing body or be always positioned outside a drive ring inner periphery which is an inner periphery of the drive ring, and in viewing the optical diaphragm device along the optical axis, at least a portion of the diaphragm blade extending portion of the diaphragm blade always overlap with the light leakage prevention blade positioned on a side opposite to the first fixing boss with the optical axis sandwiched between the first fixing boss and the light leakage prevention blade as viewed from the first fixing boss of the diaphragm blade, and in a state where the aperture diameter of the diaphragm aperture assumes a maximum value, a portion of the diaphragm blade extending portion of the diaphragm blade overlap with the light leakage prevention blade extending portion of the light leakage prevention blade positioned on the opposite side.

In the first optical diaphragm device of the present invention, the diaphragm blade extending portion is formed on the diaphragm blade, and at least the portion of the diaphragm blade extending portion of the diaphragm blade always overlaps with the light leakage prevention blade positioned on the side opposite to the first fixing boss with the optical axis sandwiched between the first fixing boss and the light leakage prevention blade as viewed from the first fixing boss of the diaphragm blade, and in a state where the aperture diameter of the diaphragm aperture assumes the maximum value, the portion of the diaphragm blade extending portion of the diaphragm blade overlaps with the light leakage prevention blade extending portion of the light leakage prevention blade positioned on the opposite side.

With such a configuration, it is possible to prevent the occurrence of a case where a distal end side of the diaphragm blade extending portion sinks below the light leakage prevention blade positioned on the side opposite to the first fixing boss with the optical axis sandwiched between the first fixing boss and the light leakage prevention blade as viewed from the first fixing boss of the diaphragm blade thus causing an exchange of the overlapping order of the blades. Accordingly, the first optical diaphragm device according to the present invention can maintain the overlapping order of the diaphragm blade and the light leakage prevention blade.

Further, in the first optical diaphragm device of the present invention, the portion of the diaphragm blade extending portion which is formed to be disposed on the more outer peripheral side than at least the inner periphery is always positioned outside the housing body inner periphery which is the inner periphery of the housing body or is always positioned outside the drive ring inner periphery which is the inner periphery of the drive ring.

Accordingly, with respect to the diaphragm blade, as in the case of a both-end supported beam, it is possible to make the diaphragm blade stride over an opening of the housing body such that the diaphragm blade is supported by the housing body inner periphery or the drive ring inner periphery on a first fixing boss side and a distal end side of the diaphragm blade extending portion. Accordingly, it is possible to prevent the occurrence of a phenomenon that distal end sides of the plurality of diaphragm blades are raised toward the diaphragm aperture in a knitted manner (a raising phenomenon). Accordingly, a quality of the optical diaphragm device in external appearance can be enhanced.

[4] A second optical diaphragm device according to the present invention is an optical diaphragm device capable of changing an aperture diameter of a diaphragm aperture by advancing or retracting a plurality of blades with respect to an optical axis, the optical diaphragm device including: a plurality of diaphragm blades each including: a first blade portion which is formed of a first planar plate and shields light incident on the aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction; a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade; a drive ring having a plurality of first cam grooves into each of which the moving boss is inserted, wherein a distance between the first cam groove and the optical axis differs corresponding to a position of the first cam groove in a circumferential direction, and the first cam groove is movable in a circumferential direction about the optical axis due to rotation of the drive ring about the optical axis; and a housing body capable of housing the diaphragm blades, the light leakage prevention blades, and the drive ring, the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the first fixing boss and the second fixing boss being inserted into the pair of the first hole and the second hole respectively, the number of pairs each consisting of the first hole and the second hole being equal to the number of pairs each consisting of the diaphragm blade and the light leakage prevention blade, a second cam groove is further formed in the light leakage prevention blade, the moving boss of the diaphragm blade is inserted into the second cam groove of the light leakage prevention blade and is inserted into the first cam groove of the drive ring, the optical diaphragm device further includes an intermediate blade disposed between the light leakage prevention blade and the diaphragm blade, and assuming that the second direction is defined as an upward direction, the diaphragm blade out of the diaphragm blade and the light leakage prevention blade which form the pair, the light leakage prevention blade out of the diaphragm blade and the light leakage prevention blade which form the pair, the intermediate blade, the diaphragm blade out of the diaphragm blade and the light leakage prevention blade which form the succeeding pair positioned adjacently to the diaphragm blade and the light leakage prevention blade which form the pair, and the light leakage prevention blade out of the diaphragm blade and the light leakage prevention blade which form the succeeding pair are arranged in an overlapping manner in the upward direction in this order, and in viewing the optical diaphragm device along the optical axis, the intermediate blade and the light leakage prevention blade out of the diaphragm blade and the light leakage prevention blade which form the pair always overlap with each other, and the intermediate blade and the diaphragm blade out of the diaphragm blade and the light leakage prevention blade which form the succeeding pair always overlap with each other.

The second optical diaphragm device of the present invention further includes the intermediate blade disposed between the light leakage prevention blade and the diaphragm blade. Further, the second optical diaphragm device is configured such that the intermediate blade and the light leakage prevention blade out of the diaphragm blade and the light leakage prevention blade which form the pair always overlap with each other. In this manner, a region where the intermediate blade and the light leakage prevention blade overlap with each other is ensured and hence, the intermediate blade is inevitably disposed on a stage above the light leakage prevention blade disposed adjacently to the intermediate blade.

Further, the second optical diaphragm device is configured such that the intermediate blade and the diaphragm blade out of the diaphragm blade and the light leakage prevention blade which form the succeeding pair always overlap with each other. In this manner, a region where the diaphragm blade and the intermediate blade overlap with each other is ensured and hence, the diaphragm blade is inevitably disposed on a stage above the intermediate blade.

In this manner, it is promised that the diaphragm blade is inevitably disposed on a stage above the light leakage prevention blade by way of the intermediate blade and hence, the second optical diaphragm device of the present invention can maintain the overlapping order of diaphragm blade and light leakage prevention blade.

[5] In the second optical diaphragm device of the present invention, it is preferable that the intermediate blade be fixed to the housing body in a state where the intermediate blade does not interfere with the movement of the diaphragm blade and movement of the light leakage prevention blade.

In other words, the second optical diaphragm device of the present invention is not configured such that the intermediate blade is operated in an interlocking manner with the diaphragm blade. Accordingly, energy for driving the blades is not consumed other than operating the diaphragm blades and the light leakage prevention blades. As a result, although the second optical diaphragm device adopts the three blades (diaphragm blades, light leakage prevention blades, and intermediate blade s) structure, it is possible to provide an optical diaphragm device which exhibits high energy efficiency.

Further, the intermediate blade is fixed in a state where the movement of the intermediate blade does not interfere with the movement of the diaphragm blade and the light leakage prevention blade and hence, the diaphragm blade and the light leakage prevention blade can be smoothly operated.

[6] In the second optical diaphragm device of the present invention, it is preferable that the diaphragm blade be formed of the first planar plate of an elongated shape having a longitudinal axis as a whole, the first fixing boss be formed on one side of the first planar plate of the diaphragm blade in the longitudinal axis direction and a diaphragm blade extending portion be formed on the other side of the first planar plate of the diaphragm blade in the longitudinal axis direction, the diaphragm blade extending portion have an inner periphery formed in a shape substantially equal to a shape of a portion of the diaphragm aperture in a state where the aperture diameter of the diaphragm aperture assumes a maximum value, a portion of the diaphragm blade extending portion which is formed to be disposed on a more outer peripheral side than at least the inner periphery be always positioned outside a housing body inner periphery which is an inner periphery of the housing body or be always positioned outside a drive ring inner periphery which is an inner periphery of the drive ring, and in viewing the optical diaphragm device along the optical axis, in a state where the aperture diameter of the diaphragm aperture assumes a minimum value, a portion of the diaphragm blade extending portion of the diaphragm blade overlap with the light leakage prevention blade positioned on a side opposite to the first fixing boss with the optical axis sandwiched between the first fixing boss and the light leakage prevention blade as viewed from the first fixing boss of the diaphragm blade, and in a process of transition of the aperture diameter of the diaphragm aperture from the minimum value to a maximum value, the portion of the diaphragm blade extending portion of the diaphragm blade overlap from above with the intermediate blade positioned on a side opposite to the first fixing boss with the optical axis sandwiched between the first fixing boss and the intermediate blade as viewed from the first fixing boss of the diaphragm blade.

In the second optical diaphragm device of the present invention, the diaphragm blade extending portion is formed on the diaphragm blade, and in the state where the aperture diameter of the diaphragm aperture assumes the minimum value (a minimum aperture state), the portion of the diaphragm blade extending portion of the diaphragm blade overlaps with the light leakage prevention blade positioned on a side opposite to the first fixing boss with the optical axis sandwiched between the first fixing boss and the light leakage prevention blade as viewed from the first fixing boss of the diaphragm blade.

With such a configuration, it is possible to prevent the occurrence of a case where a distal end side of the diaphragm blade extending portion sinks below the light leakage prevention blade positioned on the side opposite to the first fixing boss with the optical axis sandwiched between the first fixing boss and the light leakage prevention blade as viewed from the first fixing boss of the diaphragm blade thus causing an exchange of the overlapping order of the blades.

Further, the second optical diaphragm device is configured such that, in a process of transition of the aperture diameter of the diaphragm aperture from the minimum value to the maximum value, the portion of the diaphragm blade extending portion of the diaphragm blade overlaps with the intermediate blade on the side opposite to the first fixing boss of the diaphragm blade with the optical axis sandwiched between the portion of the diaphragm blade and the intermediate blade. In other words, the second optical diaphragm device is configured such that, in the process of transition of the aperture diameter of the diaphragm aperture from the minimum value to the maximum value, the portion of the diaphragm blade extending portion of the diaphragm blade is transferred onto and overlaps with the intermediate blade positioned on the side opposite to the first fixing boss with the optical axis sandwiched between the first fixing boss and the intermediate blade as viewed from the first fixing boss of the diaphragm blade from the light leakage prevention blade positioned on the side opposite to the first fixing boss with the optical axis sandwiched between the first fixing boss and the light leakage prevention blade as viewed from the first fixing boss of the diaphragm blade.

Accordingly, it is possible to prevent the occurrence of a case where a distal end side of the diaphragm blade extending portion is disposed on the same stage as the blade disposed on a stage further below the intermediate blade positioned on the side opposite to the first fixing boss with the optical axis sandwiched between the first fixing boss and the intermediate blade as viewed from the first fixing boss of the diaphragm blade, that is, a case where the distal end side of the diaphragm blade extending portion is positioned on the same stage as the diaphragm blade disposed on a stage below the intermediate blade, or sinks below such a diaphragm blade.

With such a configuration, the second optical diaphragm device according to the present invention can maintain the overlapping order of the diaphragm blade and the light leakage prevention blade.

The second optical diaphragm device of the present invention is configured such that the portion of the diaphragm blade extending portion which is formed to be disposed on a more outer peripheral side that at least the inner periphery is always positioned outside the housing body inner periphery which is the inner periphery of the housing body or is always positioned outside the drive ring inner periphery.

Accordingly, with respect to the diaphragm blade, as in the case of a both-end supported beam, it is possible to make the diaphragm blade stride over an opening of the housing body such that the diaphragm blade is supported by the housing body inner periphery or the drive ring inner periphery on a first fixing boss side and a distal end side of the diaphragm blade extending portion. Accordingly, it is possible to prevent the occurrence of a phenomenon that distal end sides of the plurality of diaphragm blades are raised toward the diaphragm aperture in a knitted manner. As a result, a quality of the optical diaphragm device in external appearance can be enhanced.

[7] In the first optical diaphragm device or the second optical diaphragm device of the present invention, it is preferable that the diaphragm blade be formed of the first planar plate of an elongated shape having a longitudinal axis as a whole, the first fixing boss be formed on one side of the first planar plate of the diaphragm blade in the longitudinal axis direction and a diaphragm blade extending portion be formed on the other side of the first planar plate of the diaphragm blade in the longitudinal axis direction, the diaphragm blade extending portion have an inner periphery formed in a shape substantially equal to a shape of a portion of the diaphragm aperture in a state where the aperture diameter of the diaphragm aperture assumes a maximum value, and an engaging convex portion which is always positioned outside a housing body inner periphery which is an inner periphery of the housing body and engages with the housing body inner periphery be further formed on the diaphragm blade extending portion.

The engaging convex portion which is always positioned outside the housing body inner periphery which is the inner periphery of the housing body or is always positioned outside the drive ring inner periphery which is the inner periphery of the drive ring and engages with the housing body inner periphery is further formed on the diaphragm blade extending portion formed in the diaphragm blade.

With such a configuration, for example, even when the aperture diameter of the diaphragm aperture becomes small, with respect to the diaphragm blade, as in the case of a both-end supported beam, it is possible to make the diaphragm blade stride over the opening of the housing body such that the diaphragm blade is supported by the housing body inner periphery or the drive ring inner periphery on a first fixing boss side and the engaging convex portion. Accordingly, it is possible to prevent, the occurrence of a phenomenon that distal, end sides of the plurality of diaphragm blades are raised toward the diaphragm aperture in a knitted manner. As a result, a quality of the optical diaphragm device in external appearance can be enhanced.

[8] A lens barrel according to the present invention is characterized in that the optical diaphragm device described in any one of the above-mentioned [1] to [7] and a lens are housed in the lens barrel.

[9] An imaging device or a projection device according to the present invention is characterized in that the imaging device or the projection device includes the optical diaphragm device described in any one of the above mentioned [1] to [7] or the lens barrel described in the above-mentioned [8].

BRIEF DESCRIPTION OF DRAWINGS

FIG. 2A to FIG. 2C are plan views for describing the optical diaphragm device 10 according to the embodiment 1.

FIG. 3 is a perspective view for describing a main part of the optical diaphragm device 10 according to the embodiment 1.

FIG. 7 is a perspective view for describing a main part of an optical diaphragm device 10a according to an embodiment 2.

FIG. 10A to FIG. 11D are plan views for describing an optical diaphragm device 10b according to a modification 1.

FIG. 11A to FIG. 11D are plan views for describing an optical diaphragm device 10c according to a modification 2.

FIG. 14A to FIG. 14D are plan views for describing a conventional optical diaphragm device 900.

DESCRIPTION OF EMBODIMENTS

Hereinafter, an optical diaphragm device, a lens barrel and an imaging device or a projection device according to the present invention are described based on embodiments shown in drawings.

Embodiment 1

1. Basic Structure of Optical Diaphragm Device 10 According to Embodiment 1

Figure 1A:
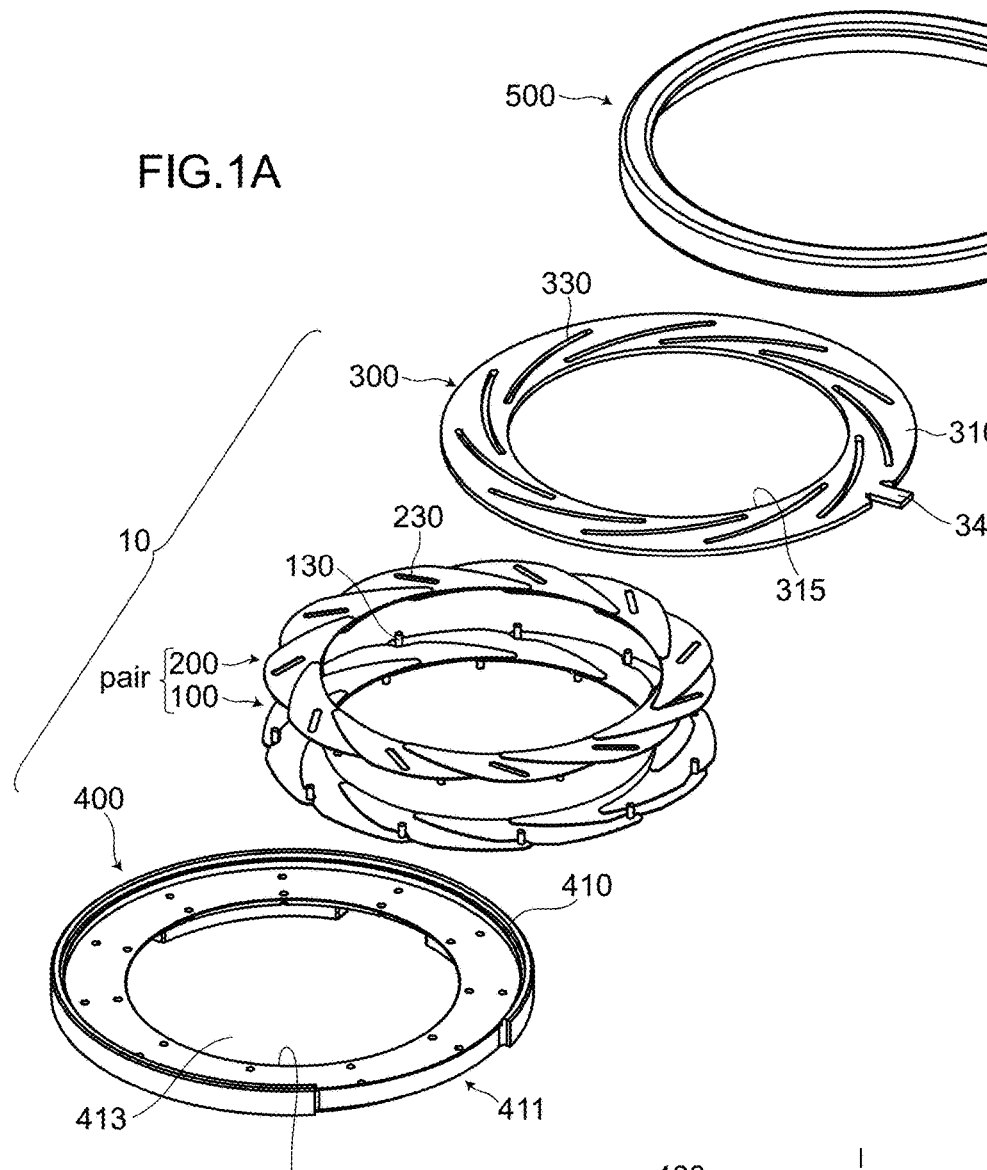
FIG. 1A and FIG. 1B are perspective views for describing an optical diaphragm device 10 according to an embodiment 1.

FIG. 1A to FIG. 2C are views for describing an optical diaphragm device 10 according to the embodiment 1. FIG. 1A is a perspective view showing a state where the optical diaphragm device 10 is disassembled. FIG. 1B is a perspective view of the optical diaphragm device 10 in an assembled state. FIG. 2A to FIG. 2C are plan views of the optical diaphragm device 10 as viewed in a plan view along an optical axis OA. FIG. 2A shows a state where a diaphragm blade 100 and a light leakage prevention blade 200 are retracted within a width (a width in a direction orthogonal to the optical axis OA) of a housing body 400. FIG. 2A shows a state (fully open state) where an aperture diameter of an aperture formed by the diaphragm blades 100 (diaphragm aperture) is set to a maximum value. FIG. 2C is a view showing a state where the aperture diameter of the diaphragm aperture is set to a minimum value (minimum aperture state). FIG. 2B is a view showing an intermediate aperture state where the diaphragm blades 100 and the light leakage prevention blades 200 are moved to a position between the fully open state and the minimum aperture state. In FIG. 2A and FIG. 2C, the diaphragm blade 100 and the light leakage prevention blade 200 which form a pair, and a first cam groove 330 which corresponds to the diaphragm blade 100 and the light leakage prevention blade 200 are illustrated, and other diaphragm blades, light leakage prevention blades, and first cam grooves are omitted from the drawings. A cover 500 is mounted on the housing body 400 for preventing the removal of a drive ring 300.

As shown in FIG. 1A to FIG. 2C, the optical diaphragm device 10 according to the embodiment 1 has a circular ring shape having an aperture 413 as viewed in a plan view along the optical axis OA. An aperture diameter AD of the diaphragm aperture is changed by protruding a plurality of blades (diaphragm blades 100 in this embodiment) toward the inside of the aperture 413 (toward the optical axis OA). An amount of light which passes through the diaphragm aperture is adjusted by changing the aperture diameter AD of the diaphragm aperture.

The optical diaphragm device 10 includes the diaphragm blades 100, the light leakage prevention blades 200, the drive ring 300, and the housing body 400. Using the housing body 400 as a receiving tray, the plurality of diaphragm blades 100 and the plurality of light leakage prevention blades 200 are stacked on the housing body 400 in an overlapping manner, and the drive ring 300 is placed on the diaphragm blades 100 and the light leakage prevention blades 200. Further, the cover 500 is placed on the drive ring 300.

As shown in FIG. 2A to FIG. 2C, the aperture diameter AD is changed in a transcending manner from an aperture diameter ADf to an aperture diameter ADm and, then, from the aperture diameter ADm to the aperture diameter in a minimum aperture state corresponding to a protruding amount of the diaphragm blades 100 toward the inside of the aperture 413.

2. Detailed Structure of Optical Diaphragm Device According to Embodiment 1

(1) Moving Boss 130 Inserted into Second Cam Groove 230 as Well as First Cam Groove 330

FIG. 3 is a perspective view for describing a main part of the optical diaphragm device 10 according to the embodiment 1.

In FIG. 3, a diaphragm blade 100j and a light leakage prevention blade 200j which form a pair, a diaphragm blade 100j+1 and a light leakage prevention blade 200j+1 which form the succeeding pair positioned adjacently to the diaphragm blade 100j and the light leakage prevention blade 200j which form the pair are shown. Portions of the drive rind 300 and the housing body 400 which correspond to the diaphragm blade 100j and the light leakage prevention blade 200j, and the diaphragm bade 100j+1 and the light leakage prevention blade 200j+1 are shown by spotlighting these constitutional elements. Other constitutional elements are omitted from the drawing. Symbol 212 indicates an outer periphery of a second blade portion 210.

In the above description, "j" is a variable used as an index, and takes an integer of 1 or more.

In the description made hereinafter, for example, there are cases where the diaphragm blade 100j/100j+1 is simply expressed as the diaphragm blade 100, or the description is made by omitting affixing the variable j. The same goes for the light leakage prevention blade 200, the first hole 401, the second hole 402 and the like.

As shown in FIG. 3, the diaphragm blade 100 (for example, particularly see diaphragm blade 100j) has: a first blade portion 110 which is formed of a first planar plate 102, protrudes toward the inside of the aperture 413 thus forming a diaphragm aperture, and shields light incident on the diaphragm aperture of the optical diaphragm device 10 (also see FIG. 2A to FIG. 2C); a first fixing boss 120 which protrudes from one surface F1 of the first planar plate 102 toward a side in a first direction along the optical axis OA;

and a moving boss 130 which protrudes from the other surface F2 of the first planar plate 102 toward a side in a second direction opposite to the first direction.

The first planar plate 102 has light shielding property, and is made of a material which allows the first planar plate 102 to mate with and to smoothly slide on other constitutional elements (the light leakage prevention blade 200, the housing body 400 and the like). The first fixing boss 120 and the moving boss 130 have a circular cylindrical (circular columnar) shape and have a fixed radius respectively. The first fixing boss 120 is inserted into the first hole 401 formed in the housing body 400 in a revolvable manner. That is, the position where the set of the first fixing boss 120 and the first hole 401j is disposed is the position where the rotary shaft of the diaphragm blade 100 is disposed. "fixing" of the first fixing boss 120 means that the position of the boss with respect to the housing body is not moved and is fixed, and the first fixing boss 120 per se is revolvable.

The light leakage prevention blade 200 (for example, particularly see light leakage prevention blade 200j in FIG. 3) has: a second blade portion 210 which is formed of a second planar plate 202 and shields light through light leaking portions other than the diaphragm aperture of the optical diaphragm device 10 (also see FIG. 2C); and a second fixing boss 220 which protrudes from one surface F3 of the second planar plate 202 toward the side in the first direction. Such a light leakage prevention blade 200 forms a pair with the above-mentioned diaphragm blade 100.

In this embodiment, "light leaking portion" is a portion other than the diaphragm aperture and is a portion which cannot be closed only by the plurality of diaphragm blades. Also in this embodiment, "shields light" through the light leaking portions may be expressed as "closes the light leaking portion".

In the same manner as the first planar plate 102, the second planar plate 202 is made of a material which allows the second planar plate 202 to mate with and to smoothly slide on other constitutional elements (the diaphragm blade 100, the housing body 400 and the like). The second fixing boss 220 has a circular cylindrical shape (circular columnar shape) and having a fixed radius. The second fixing boss 220 is inserted into a second hole 402j formed in the housing body 400 in a revolvable manner. That is, the position where the set of the second fixing boss 220 and the second hole 402 are disposed is the position where the rotary shaft of the light leakage prevention blade 200 is disposed. "fixing" of the second fixing boss 220 means that the position of the boss with respect to the housing body is not moved and is fixed, and the second fixing boss 220 per se is revolvable.

As shown in FIG. 1A to FIG. 3, first cam grooves 330 are formed in the drive ring 300. The drive ring 300 is a ring-like planar plate which has a circular opening on an inner side. The circular opening is formed by a drive ring inner periphery 315 which is an inner periphery of the drive ring 300.

The moving boss 130 is inserted into the first cam groove 330. The first cam groove 330 is formed such that a distance between the first cam groove 330 and the optical axis OA differs corresponding to a position of the cam groove. However, the first cam groove 330 may partially have a zone where the distance between the first cam groove 330 and the optical axis OA is equal when the cam groove is viewed along a circumferential direction.

When such a drive ring 300 is rotated about the optical axis OA, the first cam groove 330 is moved in the circumferential direction about the optical axis OA. In this case, the moving boss 130 inserted into the first cam groove 330 is rotated about the first fixing boss 120 inserted into the first hole 401. That is, the moving boss 130 is moved in a direction toward the inside of the aperture 413 (hereinafter referred to as −r direction) or in a direction toward the outside of the aperture 413 (hereinafter referred to as r direction) using the first fixing boss 120 as the center of rotation corresponding to a direction that the drive ring 300 is rotated.

Although any method may be adopted as a method for imparting a rotational force to the drive ring 300, in this embodiment, a rotary lever 340 which integrally rotates with a drive ring body 310 is formed on the drive ring 300, and a force is applied to the rotary lever 340 by a rotational force applying unit not shown in the drawing.

As shown in FIG. 1A to FIG. 3, the housing body 400 has a circular ring shape as an overall shape, and has the aperture 413 inside thereof. As described previously, the housing body 400 accommodates the diaphragm blades 100, the light leakage prevention blades 200, and the drive ring 300. The circular aperture 413 is formed of a housing body inner periphery 415 which is an inner periphery of the housing body 400.

In this embodiment, n sets each consisting of the first hole 401 and the second hole 402 (n being the number of pairs each consisting of the diaphragm blade 100 and the light leakage prevention blade 200) (n: an integer of 2 or more) are formed in the housing body 400. The first hole 401 and the second hole 402 are formed corresponding to the above-mentioned diaphragm blade 100 and the light leakage prevention blade 200 which form a pair. The first fixing boss 120 and the second fixing boss 220 are inserted into the part of the first hole 401 and the second hole 402 respectively.

Further, as shown in FIG. 1A, the housing body 400 has a notched portion 411. The notched portion 411 is formed by cutting away a portion of an outer peripheral wall 410 so as to allow the rotation of the rotary lever 340 of the drive ring 300.

As a whole, the optical diaphragm device 10 has n sets (a plurality of pairs) each consisting of the diaphragm blade 100 and the light leakage prevention blade 200 which forms the above-mentioned pair. n pieces (a plurality of) first cam grooves 330 are formed in the drive ring 300 such that the first cam grooves 330 respectively correspond to the moving bosses 130 formed on the respective diaphragm bases 100. For example, the optical diaphragm device 10 has 11 sets each consisting of the diaphragm blade 100 and the light leakage prevention blade 200 as shown in FIG. 1A to FIG. 3.

As shown in FIG. 2a, FIG. 2C, FIG. 3 and the like, the diaphragm blade 100 and the light leakage prevention blade 200 which form the pair are stacked each other toward the second direction in order of the diaphragm blade 100 and the light leakage prevention blade 200.

That is, when "second direction" is defined as an upward direction and "first direction" is defined as a downward direction, the diaphragm blade 100j out of "the diaphragm blade 100j and the light leakage prevention blade 200j which form the pair", the light leakage prevention blade 200j out of "the diaphragm blade 100j and the light leakage prevention blade 200j which form the pair", the diaphragm blade 100j+1 out of "the diaphragm, blade 100j+1 and the light leakage prevention blade 200j+1 which form the succeeding pair" positioned adjacently to the diaphragm blade 100j and the light leakage prevention blade 200j which form the pair, and the light leakage prevention blade 200j+1 out of "the diaphragm blade 100j+1 and the light leakage prevention blade 200*j*+1 which form the succeeding pair" are arranging an overlapping manner in the upward direction in this order (see FIG. 3).

In addition to the above-mentioned configuration, a second cam groove 230 is formed in the light leakage prevention blade 200. The second cam groove 230 is disposed at the position which corresponds to the moving boss 130.

The moving boss 130 of the diaphragm blade 100 is inserted into the second cam groove 230 of the light leakage prevention blade 200, and is also inserted into the first cam groove 330 of the drive ring 300.

Although the moving boss 130 is "inserted into" the first cam groove 330 and the second cam groove 230, the moving boss 130 may not be inserted into the first cam groove 330 over a portion of a depth of the first cam groove 330 (a thickness of the drive ring 300), or may penetrate the first cam groove 330 in addition to the second cam groove 230. In the embodiment 1, the moving boss 130 is in a state where the moving boss 130 substantially penetrates the first cam groove 330.

(2) Arrangement Relationship Between First Fixing Boss 120 and Second Fixing Boss 220

Figure 4A:
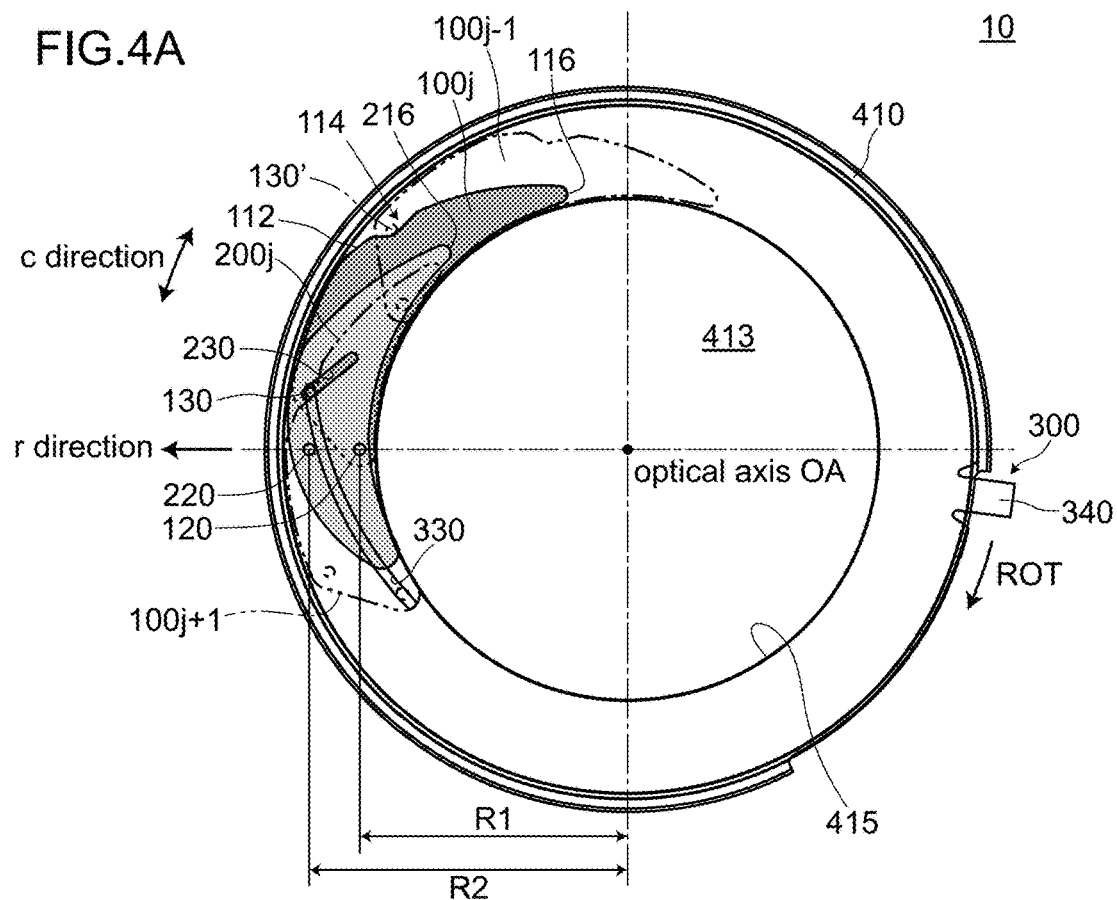
FIG. 4A and FIG. 4B are plan views for describing a positional relationship between a first fixing boss 120, a second fixing boss 220, a moving boss 130, a first cam groove 330, and a second cam groove 230 and the like in the optical diaphragm device 10 according to the embodiment 1.
Figure 4B:
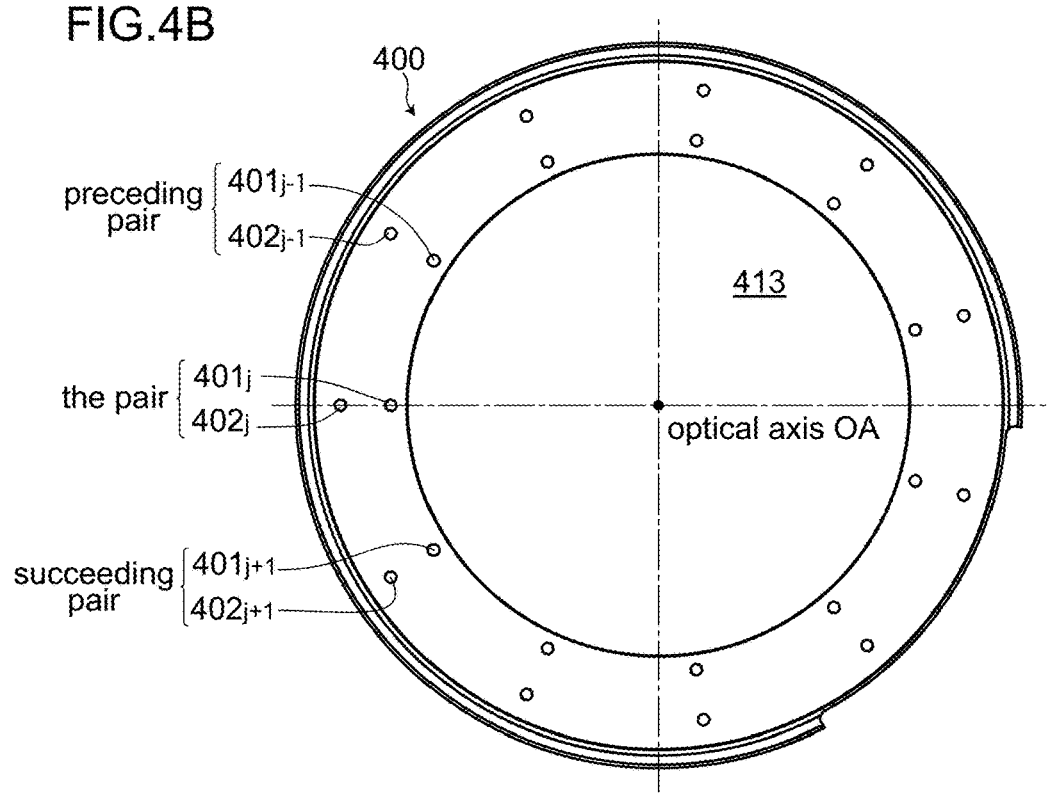

FIG. 4A and FIG. 4B are plan views for describing a positional relationship between the first fixing boss 120, the second fixing boss 220, the moving boss 130, the first cam groove 330, the second cam groove 230 and the like in the optical diaphragm device 10 according to the embodiment 1. FIG. 4A shows the diaphragm blade 100*j* and the light leakage prevention blade 200*j* which form a pair, the first cam groove 330 and the second cam groove 230 which correspond to these blades 100*j*, 200*j*, and the diaphragm blade 100*j*+1 out of the diaphragm blade 100*j*+1 and the light leakage prevention blade 200*j*+1 which form the succeeding pair. FIG. 4A and FIG. 4B also show a diaphragm blade 100*j*−1 out of the diaphragm blade 100*j*−1 and a light leakage prevention blade 200*j*−1 which form a preceding pair positioned adjacently to the diaphragm blade 100*j* and the light leakage prevention blade 200*j* which form the pair, and the moving boss 130' which corresponds to the diaphragm blade 100*j*−1. The diaphragm blades and the light leakage prevention blades which form other pairs and constitutional elements which correspond to these blades are not shown in the drawing. FIG. 4B shows a mode where a plurality of pairs of holes into which the first fixing bosses 120 and the second fixing bosses 220 are inserted are formed in the housing body 400. The plurality of pairs of holes are formed of a plurality of pairs each formed of the first hole 401*j* and the second hole 402*j*; a plurality of preceding pairs each formed of the first hole 401*j*−1 and the second hole 402*j*−1; and a plurality of succeeding pairs each formed of the first hole 401*j*+1 and the second hole 402*j*+1. Other constitutional elements are omitted from the drawing.

In the optical diaphragm device 10 according to the embodiment 1, as shown in FIG. 4A and FIG. 4B, the first fixing boss 120 and the second fixing boss 220 are disposed at positions which differ from each other in distance from the optical axis OA. In other words, the first fixing boss 120 and the second fixing boss 220 are disposed in a displaced manner toward an inner peripheral side and an outer peripheral side respectively (also see FIG. 3 and the like). For example, to describe the above-mentioned arrangement with reference to FIG. 4A, assuming a distance from the optical axis OA to the first fixing boss 120 as R1 and a distance from the optical axis OA to the second fixing boss 220 as R2, the first fixing boss 120 and the second fixing boss 220 are disposed so as to satisfy a relationship of R2>R1.

In correspondence with the arrangement relationship between the first fixing boss 120 and the second fixing boss 220, in the housing body 400, the first hole 401*j* and the second hole 402*j* which form a pair and into which the first fixing boss 120 and the second fixing boss 220 are inserted are disposed at positions which differ from each other in distance from the optical axis OA.

FIG. 4A shows the example where the first fixing boss 120 is disposed on the inner peripheral side. However, the optical diaphragm device 10 of the embodiment 1 is not limited to such an example. That is, the second fixing boss 220 may be disposed on the inner peripheral side of the first fixing boss 120.

(3) Light Leakage Prevention Blade Extending Portion 250

Assuming a side where the second blade portion 210 of the second planar plate 202 of the light leakage prevention blade 200 is positioned as viewed from the second fixing boss 220 as one side, the light leakage prevention blade 200 further has a light leakage prevention blade extending portion 250 which extends toward the other side from the second fixing boss 220 (see FIG. 3 and the like).

That is, the light leakage prevention blade 200 is formed of the second planar plate 202 of an elongated shape having a longitudinal axis as a whole, and a second fixing boss 220 is disposed in the vicinity of the center of the second planar plate 202 as viewed in the longitudinal axis direction of the second planar plate 202. The light leakage prevention blade extending portion 250 is disposed on the second planar plate 202 on the other side of the second fixing boss 220.

It is preferable that the shape of an inner periphery of an inner side (an optical axis OA side) of the light leakage prevention blade extending portion 250 be substantially the same as a portion of the shape of the diaphragm aperture when the aperture diameter of the diaphragm aperture assumes a maximum value. It is because, by arranging the light leakage prevention blade extending portion 250 as close as possible to a region inside the aperture opening, it is possible to make the light leakage prevention blade extending portion 250 more easily overlap with the diaphragm blade which overlaps with the light leakage prevention blade.

3. Manner of Operation and Advantageous Effects of Optical Diaphragm Device 10 According to Embodiment 1

(1) Moving Boss 130 Inserted into Second Cam Groove 230 as Well as First Cam Groove 330

As described above, the optical diaphragm device 10 according to the embodiment 1 is an optical diaphragm device capable of changing an aperture diameter of the diaphragm aperture by advancing or retracting the plurality of blades with respect to the optical axis, and the optical diaphragm device 10 includes: the diaphragm blades 100; the light leakage prevention blades 200 each forms a pair with each corresponding diaphragm blade 100; the drive ring 300; and the housing body 400.

h diaphragm blade 100 has: the first blade portion 110 which is formed of the first planar plate 102 and shields light incident on the diaphragm aperture (aperture formed by the blades 100) of the optical diaphragm device 10; the first fixing boss 120 which protrudes from one surface F1 of the first planar plate 102 toward the side in the first direction along the optical axis OA; and the moving boss 130 which protrudes from the other surface F2 of the first planar plate 102 toward the side in the second direction opposite to the first direction.

The light leakage prevention blade 200 has: the second blade portion 210 which is formed of the second planar plate 202 and shields light through light leaking portions other than the diaphragm aperture of the optical diaphragm device 10; and the second fixing boss 220 which protrudes from one surface F3 of the second planar plate 202 toward the side in the first direction.

The drive ring 300 has the first cam grooves 330 into which the moving, bosses 130 are inserted. With respect to the first cam groove 330, a distance between the first cam groove 330 and the optical axis OA differs corresponding to the position of the cam groove. The drive ring 300 is rotatable about the optical axis OA. Accordingly, when the drive ring 300 is rotated about the optical axis OA, the first cam grooves 330 are moved in a circumferential direction. Accordingly, the moving bosses 130 inserted into the first cam grooves 330 are moved in the r direction or the −r direction.

The housing body 400 accommodates the diaphragm blades 100, the light leakage prevention blades 200, and the drive ring 300.

The optical diaphragm device 10 includes n sets (a plurality of pairs) each consisting of the diaphragm blade 100 and the light leakage prevention blade 200 which form a pair. In this embodiment, n pieces of (a plurality of) first cam grooves 330 are formed in the drive ring 300 respectively corresponding to the moving bosses 130 formed on the respective diaphragm blades 100.

In this embodiment, n sets each consisting of the first hole 401j and the second hole 402j (n being the number of pairs each consisting of the diaphragm blade 100 and the light leakage prevention blade 200) are formed in the housing body 400. The first hole 401j and the second hole 402j are formed corresponding to the diaphragm blade 100 and the light leakage prevention blade 200 which form a pair. The first fixing boss 120 and the second fixing boss 220 are inserted into the pair of the pair of the first hole 401j and the second hole 402j respectively.

The second cam groove 230 is formed in the light leakage prevention blade 200, and the moving boss 130 of the diaphragm blade 100 is inserted into the second cam groove 230 of the light leakage prevention blade 200 and is inserted into the first cam groove 330 of the drive ring 300.

In the optical diaphragm device 10 according to the embodiment 1, as described above, the second cam groove 230 is further formed in the light leakage prevention blade 200. The moving boss 130 of the diaphragm blade 100 is inserted into the second cam groove 230 of the light leakage prevention blade 200 and is inserted into the first cam groove 330 of the drive ring 300.

With such a structure, the following operations are performed.

(1) The drive ring 300 is rotated by receiving a rotational force from a rotational force applying unit not shown in the drawing.

(2) When the drive ring 300 is rotated, in the diaphragm blade 100, a force acts on the moving boss 130 from the drive ring 300 by way of the first cam groove 330. That is, the diaphragm blade 100 is rotated using the moving boss 130 as a point where a force is applied and the first fixing boss 120 as a fulcrum (rotary shaft).

(3) Along with the rotation (movement in the −r direction) of the moving boss 130 about the first fixing boss 120, in the light leakage prevention blade 200, a force acts on the second cam groove 230 from the moving boss 130. That is, the light leakage prevention blade 200 is rotated using a portion where a force acts on the second cam groove 230 from the moving boss 130 as a point where the force is applied and the second fixing boss 220 as a fulcrum (rotary shaft) (see FIG. 2C, FIG. 3 and the like).

In this manner, in the optical diaphragm device 10 according to the embodiment 1, although the boss which is inserted into the first cam groove 330 of the drive ring 300 is only the moving boss 130 of the diaphragm blade 100, the light leakage prevention blade 200 can also be driven in an interlocking manner with driving of the diaphragm blade 100.

Accordingly, it is sufficient to set the length of the first cam groove 330 to a length necessary for driving the diaphragm blade 100, and it is unnecessary to form a cam groove for driving the light leakage prevention blade 200. Accordingly, the length of the first cam groove 330 can be made shorter than the length of the cam groove in the conventional optical diaphragm device by an amount necessary for forming such a groove. Further, it is sufficient to form the first cam groove 330 only for driving the diaphragm blade 100 and hence, it is unnecessary to take into account driving of the light leakage prevention blade 200. As a result, the degree of freedom in designing the first cam groove 330 can be enhanced by an amount necessitated when it is necessary to take into account driving of the light leakage prevention blade 200. In this manner, the length of the first cam groove 330 can be shortened and the degree of freedom in designing the first cam groove 330 can be enhanced and hence, the number of first cam grooves 330 which can be formed in the drive ring 300 can be easily increased. Because of such an advantageous effect, the number of diaphragm blades 100 can also be easily increased. The number of light leakage prevention blades 200 each forms a pair with the corresponding diaphragm blade 100 can also be easily increased.

(2) Arrangement Relationship Between Set of First Fixing Boss 120 and First Hole 4011 and Set of Second Fixing Boss 220 and Second Hole 402j As described previously, in the optical diaphragm device 10 according to the embodiment, the set of the first fixing boss 120 and the first hole 401j is disposed at the position which differs from the position where the set of the second fixing boss 220 and the second hole 402j is disposed with respect to a distance from the optical axis OA. Accordingly, the plurality of sets of the first fixing boss 120 and the first hole 401j and the plurality of sets of the second fixing boss 220 and the second hole 402j can be respectively formed on respective circumferences which differ from each other in distance from the optical axis OA. Accordingly, it is possible to easily increase the number of pairs each consisting of the first fixing boss 120 and the first hole 401j which form the pair and the second fixing boss 220 and the second hole 402j which form the pair. As a result, it is possible to easily increase the number of diaphragm blades 100.

The above-mentioned arrangement relationship is described in more detail with reference to FIG. 5A and FIG. 5B.

Figure 5A:
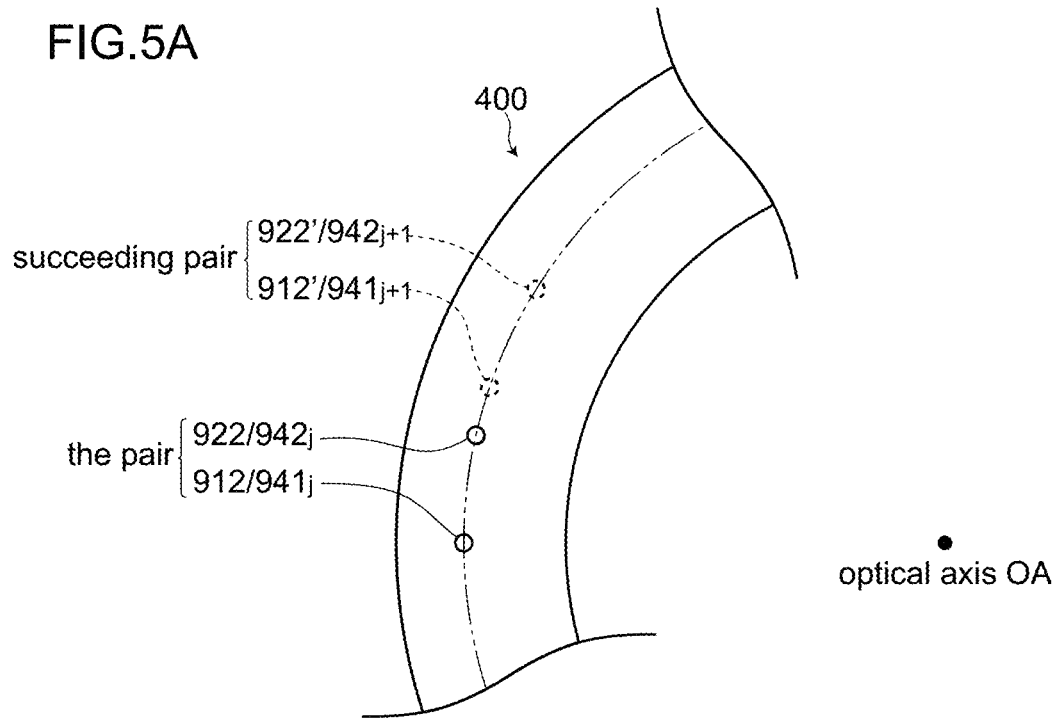
FIG. 5A and FIG. 5B are plan views for describing a positional relationship between the first fixing boss 120, a first hole 401, the second fixing boss 220, and a second hole 102 in the optical diaphragm device 10 according to the embodiment 1.
Figure 5B:
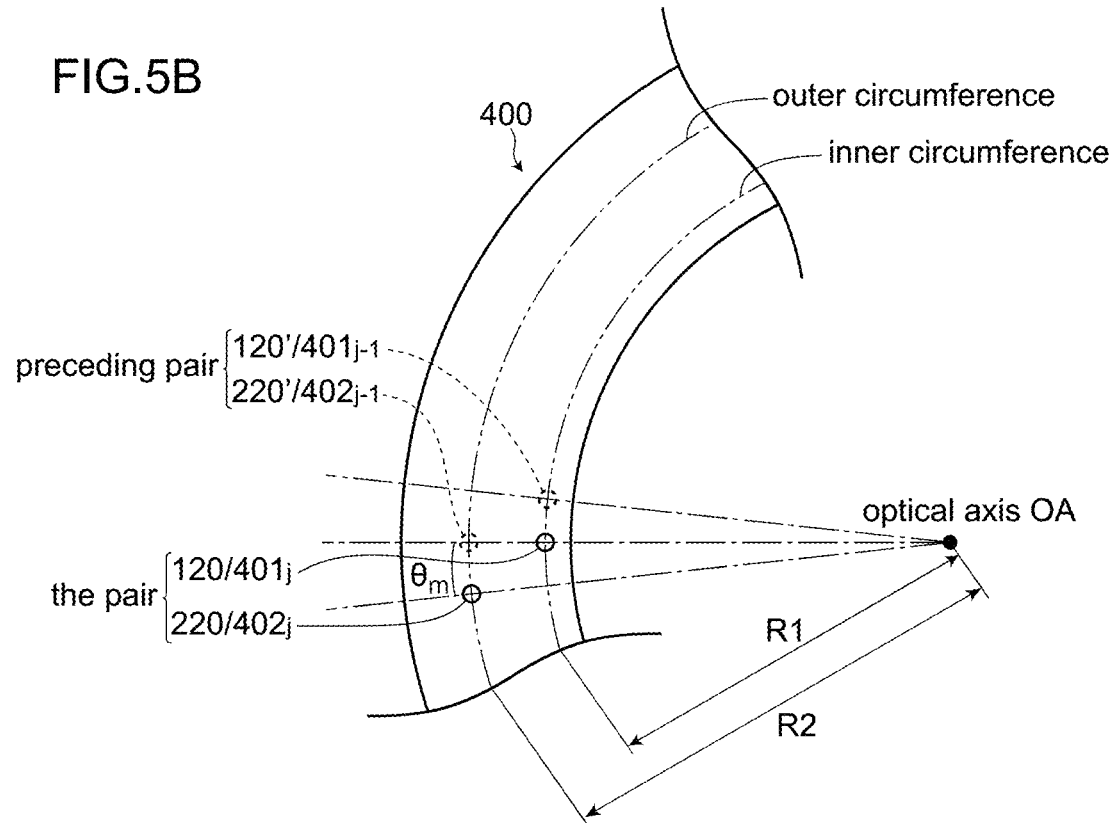

FIG. 5A and FIG. 5B are plan views for describing an advantageous effect acquired by the optical diaphragm device 10 according to the embodiment 1. FIG. 5A is a view which corresponds to the conventional optical diaphragm device 900, and FIG. 5B is a view which corresponds to the optical diaphragm device 10 according to the embodiment 1. In FIG. 5A and FIG. 5B, only a part of the housing body 400 is shown.

FIG. 5A shows the arrangement relationship between the set of the diaphragm blade fixing boss 912 and the first hole 941j (j: an integer of 1 or more) and the set of the light leakage prevention blade fixing boss 922 and the second hole 942j (j: an integer of 1 or more). FIG. 5B shows the arrangement relationship between the set of the first fixing boss 120 and the first hole 401j (j: an integer of 1 or more) and the set of the second fixing boss 220 and the second hole 402j (j: an integer of 1 or more). Other constitutional elements are omitted from the drawing.

(a) Conventional Optical Diaphragm Device

In the optical diaphragm device in accordance with the conventional optical diaphragm device 900, as shown also in FIG. 5A, the set of the diaphragm blade fixing boss 912 and the first hole 941j and the set of the light leakage prevention blade fixing boss 922 and the second hole 942j are disposed at the same position in distance from the optical axis OA. That is, the set of the diaphragm blade fixing boss 912 and the first hole 941j and the set of the light leakage prevention blade fixing boss 922 and the second hole 942j are disposed on the same circumference (also see FIG. 14D).

Accordingly, in increasing the number of diaphragm blades 910, it is necessary to increase the number of pairs each consisting of the set of the diaphragm, blade fixing boss and the first hole and the set of the light leakage prevention blade fixing boss and the second hole disposed on the same circumference. In this case, it is necessary to take into account a distance between the set of the diaphragm blade fixing boss 912 and the first hole 941j and the set of the light leakage prevention blade fixing boss 922 and the second hole 942j. Further, it is also necessary to take into account a distance between one pair consisting of the set of the diaphragm blade fixing boss 912 and the first hole 941j and the set of the light leakage prevention blade fixing boss 922, and the second hole 942j acid another pair consisting of the set of the diaphragm blade fixing boss 912' and the first hole 941j+1 (the symbol being one example and the symbol possibly being 941j−1) and the set of the light leakage prevention blade fixing boss 922' and the second hole 942j+1 (one example), another pair being positioned adjacently to the pair.

Accordingly, it is difficult to increase the number of diaphragm blades 910 in the conventional optical diaphragm device.

(b) Optical Diaphragm Device According to Embodiment 1

On the other hand, in the optical diaphragm device 10 according to the embodiment 1, the set of the first fixing boss 120 and the first hole 401j and the set of the second fixing boss 220 and the second hole 402j are disposed at positions which differ from each other in distance from the optical axis OA. In other words, the set of the first fixing boss 120 and the first hole 401j and the set of the second fixing boss 220 and the second hole 402j are disposed in a displaced manner toward the inner peripheral side and toward the outer peripheral side.

Accordingly, as shown in FIG. 5B, it is possible to arrange the set of the first fixing boss 120 and the first hole 401j and the set of the second fixing boss 220 and the second hole 402j on respective circumferences the inner circumference and the outer circumference) which differ from each other in distance from the optical axis OA.

Accordingly, the degree of freedom in designing is increased and hence, the number of pairs each consisting of the set of the first fixing boss 120 and the first hole 401j and the set of the second fixing boss 220 and the second hole 402j can be easily increased. As a result, the number of diaphragm blades 100 is easily increased.

There may be a case where it is necessary to take into account an inter-distance between the set of the first fixing boss 120 and the first hole 401j and the set of the first fixing boss 120' and the first hole 401j−1 (the symbol being one example, and the symbol possibly being 401j−1) disposed adjacently to the set of the first fixing boss 120 and the first hole 401j on the same circumference, for example. However, provided that a difference between the inner diameter R1 and the outer diameter R2 (also see FIG. 4A) is sufficiently large compared to an inter-distance between the set of the first fixing boss 120 and the first hole 401j and the set of the first fixing boss 120' and the first hole 401j−1 (one example) disposed adjacently to the set of the first fixing boss 120 and the first hole 401j, in designing the diaphragm device, as shown in FIG. 5B, it is sufficient to ensure a predetermined margin θm between the set of the first fixing boss 120 and the first hole 401j and the set of the first fixing boss 120' and the first hole 401j−1 (one example) disposed adjacently to the set of the first fixing boss 120 and the first hole 401j.

With such a configuration, according to the optical diaphragm device of the embodiment 1, the number of first cam grooves, the number of first fixing bosses and the first holes and the like can be easily increased and hence, it is possible to provide the optical diaphragm device where the number of diaphragm blades can be easily increased.

(3) Manner of Operation and Advantageous Effects of Light Leakage Prevention Blade Extending Portion 250

Figure 6A:
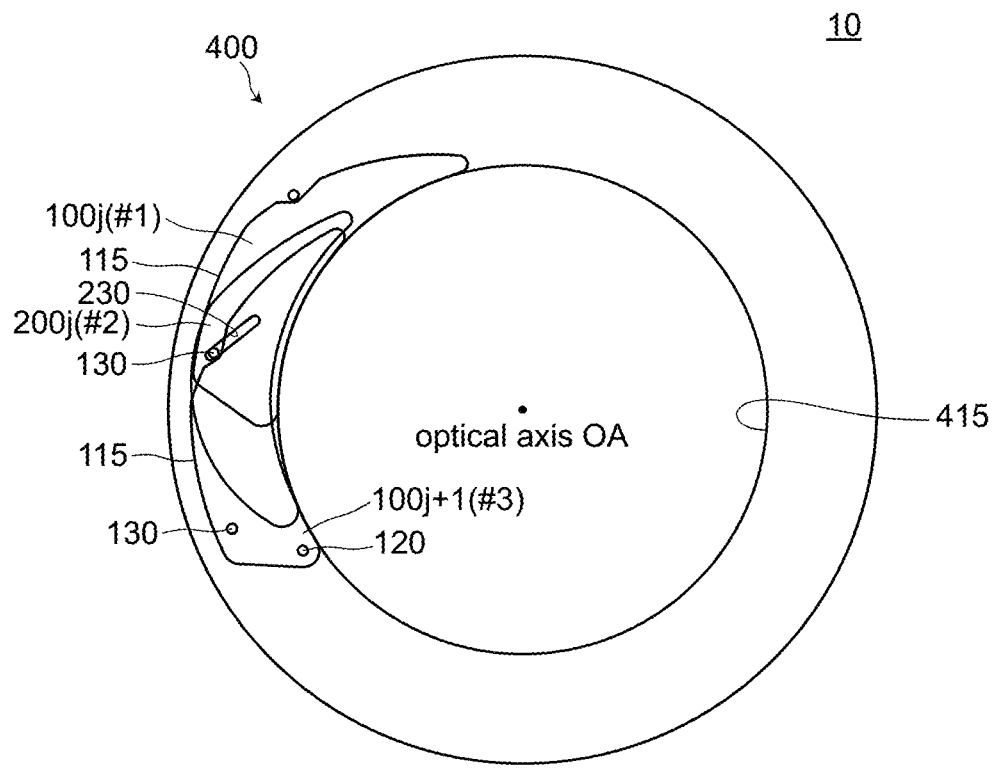
FIG. 6A and FIG. 6B are plan views for describing a manner of operation and an advantageous effect acquired by the optical diaphragm device 10 according to the embodiment 1.
Figure 6B:
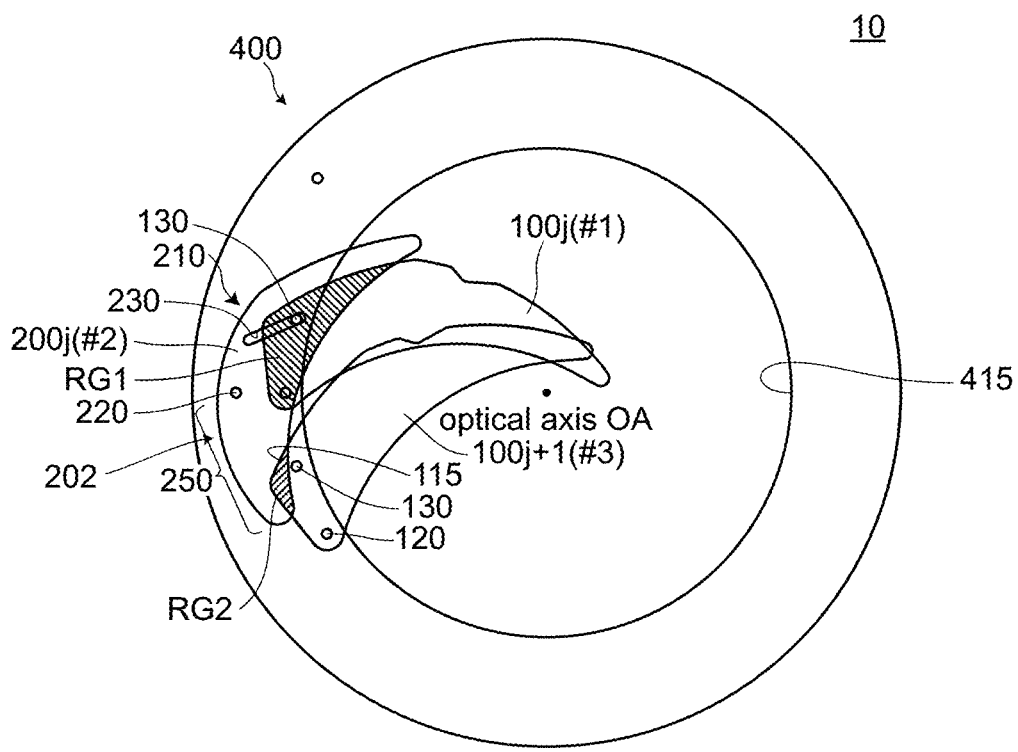

FIG. 6A and FIG. 6B are plan views for describing a manner of operation and an advantageous effect acquired by the optical diaphragm device 10 according to the embodiment 1. FIG. 6A shows a state (fully open state) where the aperture diameter of the diaphragm aperture is set to a maximum value, and FIG. 6B shows a state (minimum aperture state) where the aperture diameter of the diaphragm aperture is set to a minimum value. In FIG. 6A and FIG. 6B, only a diaphragm blade 100j (#1) and a light leakage prevention blade 200j (#2) which form a pair, and a diaphragm blade 100j (#3) out of the diaphragm blade 100j (#3) and a light leakage prevention blade 200j which form the succeeding pair positioned adjacently to the diaphragm blade 100j (#1) and the light leakage prevention blade 200j (#2) which form the pair are shown. Other diaphragm blades, light leakage prevention blades and the like are omitted from the drawing.

As shown in FIG. 6A and FIG. 6B, in the optical diaphragm device 10 according to the embodiment 1, assuming a side where the second blade portion 210 of the second planar plate 202 of the light leakage prevention blade 200j is positioned as viewed from the second fixing boss 220 as one side, the light leakage prevention blade 200j further has the light leakage prevention blade extending portion 250 which extends toward the other side from the second fixing boss 220 (also see FIG. 3).

With the formation of the light leakage prevention blade extending portion 250, as shown in FIG. 6B, for example, even when the optical diaphragm device 10 is brought into a minimum aperture state, it is possible to make a portion of the diaphragm blade 100j+1 (#3) overlap with the light leakage prevention blade extending portion 250 of the light leakage prevention blade 200j.

As a result, the diaphragm blade 100j (#1) and the light leakage prevention blade 200j (#2) disposed on a stage above the diaphragm blade 100j (#1) overlap with each other in a first region RG1, and the light leakage prevention blade 200j (#2) and the diaphragm blade 100j+1 (#3) disposed on a stage above the light leakage prevention blade 200j (#2) overlap with each other in a second region RG2. Accordingly, there is no possibility that the overlapping order of the blades (#1 to #3) where the diaphragm blade 100j (#1), the light leakage prevention blade 200j (#2) and the diaphragm blade 100j+1 (#3) overlap with each other in this order from below to above collapses.

The above-mentioned overlapping is guaranteed not only in the process from the fully open state shown in FIG. 6A to the state shown in FIG. 6B but also in the process performed in a reversed manner. Accordingly, over the entire process of adjusting the aperture, it is possible to allow the light leakage prevention blade extending portion 250 of the light leakage prevention blade 200j and the diaphragm blade 100j+1 overlapping with the light leakage prevention blade 200j from above to continue such an overlapping state.

Accordingly, it is possible to prevent the occurrence of a case where the diaphragm blade 100j+1 (#3) falls out from the light leakage prevention blade 200j (#2) and is disposed on the same stage as the light leakage prevention blade 200j (#2) or the occurrence of a case where the diaphragm blade 100j+1 (#3) sinks below the light leakage prevention blade 200j (#2) thus causing an exchange of the overlapping order of the blades.

With such a configuration, the optical diaphragm device 10 according to the embodiment 1 can maintain the overlapping order of the diaphragm blade 100 and the light leakage prevention blade 200.

4. Other Detailed Structures of Optical Diaphragm Device 10 According to Embodiment 1

(1) Structure where First Fixing Bosses 120 are Disposed on Inner Peripheral Side As shown in FIG. 3 to FIG. 4B, in the optical diaphragm device 10 according to the embodiment 1, the set of the first fixing boss 120 and the first hole 401j is disposed at the position where the distance from the optical axis OA to the set of the first fixing boss 120 and the first hole 401j is shorter than the distance from the optical axis OA to the set of the second fixing boss 220 and the second hole 402j. That is, the set of the first fixing boss 120 and the first hole 401j is disposed more on the inner peripheral side than the set of the second fixing boss 220 and the second hole 402j.

The position where the set of the first fixing boss 120 and the first hole 401j is disposed is, in other words, the position where the rotary shaft of the diaphragm blade 100 is disposed.

In such a configuration, an attention is focused on a rotation angle of the diaphragm blade 100 which rotates between the position where the diaphragm blade 100 is in a fully open state and the position where the diaphragm blade 100 is in a minimum aperture state. In general, the nearer the rotary shaft of the diaphragm blade 100 is disposed to the optical axis OA, the larger the rotation angle becomes. When the rotation angle of the diaphragm blade 100 is increased, in general, driving of the diaphragm blade 100 is minimally affected by irregularities in manufacture in positions, sizes or the like of the first fixing boss 120, the first hole 401, the moving boss 130, and the first cam groove 330 of the drive ring 300 and the like.

In view of the above, it is possible to realize the diaphragm aperture with high accuracy as a whole by arranging the set of the first fixing boss 120 and the first hole 401j at a position where the distance from the optical axis OA to the set of the first fixing boss 120 and the first hole 401j is shorter than the distance from the optical axis OA to the set of the second fixing boss 220 and the second hole 402j, that is, by arranging the rotary shaft of the diaphragm blade 100 at the position closer to the optical axis OA.

Further, in general, along with the increase of a distance between the position at which the rotary shaft of the diaphragm blade 100 is disposed and the optical axis OA, it is necessary to increase a length of the diaphragm blade 100.

In view of the above, the length of the diaphragm blade 100 can be decreased by arranging the rotary shaft of the diaphragm bade 100 closer to the optical axis OA (by arranging the set of the first fixing boss 120 and the first hole 401j at the position closer to the optical axis OA than the position of the set of the second fixing boss 220 and the second hole 402j). By decreasing the length of the diaphragm blade 100, inertia of the diaphragm blade 100 during rotation can be decreased and hence, accuracy of rotation and velocity can be enhanced. Downsizing of the optical diaphragm device 10 can also be realized.

(2) Structure where Set of First Fixing Boss 120 and First Hole 401j and Set of Second Fixing Boss 220 and Second Hole 402j are Disposed in the Same Radial Direction As shown in FIG. 3 to FIG. 4B, in the optical diaphragm device 10 according to the embodiment 1, the set of the first fixing boss 120 and the first hole 401j, and the set of the second fixing boss 220 and the second hole 402j are arranged on the same straight line extending in a radial direction (r direction) from the optical axis OA. That is, the optical axis OA, the set of the first fixing boss 120 and the first hole 401j, and the set of the second fixing boss 220 and the second hole 402j are arranged on the same straight line.

With such a configuration, an angle which the set of the first fixing boss and the first hole 401j and the set of the second fixing boss and the second hole 402j which form a pair occupies (an angle made by a line which connects the set of the first fixing boss and the first hole 401j with the optical axis OA and a line which connects the set of the second fixing boss and the second hole 402j with the optical axis OA) can be minimized. That is, such an occupied angle can be set to 0°.

As described above, the occupied angle can be minimized and hence, it is possible to arrange the larger number of pairs each consisting of the set of the first fixing boss 120 and the first hole 401j and the set of the second fixing boss 220 and the second hole 402j around the optical axis OA whereby the degree of freedom in designing the optical diaphragm device can be enhanced.

With such a configuration, it is possible to provide the optical diaphragm device which enables easy working and inspection of the optical diaphragm device 10. For example, when the first holes 401j and the second holes 402j are formed in the housing body 400 by working with reference to the optical axis OA, it is sufficient that the first holes 401j are formed by working and, thereafter, the second holes 402j are formed by working while changing a distance only in a radial direction (by shifting a working head in an r direction) without changing an angle with respect to the optical axis OA. Accordingly, working can be continued without performing a process of changing an angle. Substantially the same manner of operation and advantageous effects can be acquired also in the inspection of the optical diaphragm device.

(3) Recessed Portion 114 Formed by Cutting Out Outer Periphery of Diaphragm Blade 100

As shown in FIG. 3 to FIG. 4B, in the optical diaphragm device 10 according to the embodiment 1, a recessed portion 114 is formed on an outer profile 115 of the diaphragm blade 100 by cutting. The recessed portion 114 is formed so as to allow the moving boss 130' relating to the diaphragm blade 100j−1 (see double-dashed chain line in FIG. 4A) and the light leakage prevention blade 200j−1 (not shown in the drawing) which form the preceding pair to be disposed in the recessed portion 114 when the diaphragm blade 100 is moved to the position where the aperture diameter of the diaphragm aperture becomes maximum.

A width of the diaphragm blade 100 is decided depending on designing of the optical diaphragm device. Depending on a design of the diaphragm device, there may be a case where the outer profile 115 of the diaphragm blade 100 interferes with the moving boss relating to the diaphragm blade and the light leakage prevention blade which form another pair which is the neighboring pair in a plan-view layout. In a case where there exists a concern that such interference occurs, a design may be considered where the moving boss is disposed at the position which is further shifted in a radial direction (r direction) so as to move the moving boss away from the outer profile 115. However, in this case, the optical diaphragm device becomes large-sized by an amount that the moving boss is shifted.

On the other hand, in the embodiment 1, the recessed portion 114 is formed on the outer profile 115 of the diaphragm blade 100. Accordingly, it is possible to avoid the interference between the diaphragm blade 100 out of the diaphragm blade 100j and the light leakage prevention blade 200j which form a pair with the moving boss 130' relating to the diaphragm blade 100j-1 and the light leakage prevention blade 200j-1 (not shown in drawing) which form the preceding pair. As a result, large sizing of the optical diaphragm device can be suppressed.

It is preferable that the size of the recessed portion 114 formed on the diaphragm blade 100 be set to a size which prevents the formation of a gap between the diaphragm blade 100 and the recessed portion 114 of the diaphragm blade 100 which is disposed adjacently to the diaphragm blade 100 and forms the succeeding pair when the aperture diameter of the diaphragm aperture is throttled at maximum in cooperation with the plurality of diaphragm blades 100. Assuming a case where the size of the recessed portion 114 is set large, when the aperture diameter of the diaphragm aperture is throttled, there is a possibility that a gap is formed between the diaphragm blade 100 and the recessed portion 114 of the diaphragm blade 100 which is disposed adjacently to the diaphragm blade 100 and hence, the recessed portion becomes a cause of a leakage of light. Further, in the case where the recessed portion 114 becomes a cause of a leakage of light, it is necessary to largely increase the size of the light leakage prevention blade 200 so as to shield the gap and hence, there is a possibility that such a configuration is not available due to the restriction imposed on the space.

(4) Inclination Direction of First Cam Groove 330

In the optical diaphragm device 10 according to the embodiment 1, as shown in FIG. 4A, the first cam groove 330 is formed at an angle which is inclined in a direction away from the optical axis OA toward a diaphragm rotational direction ROT with respect to a circumferential direction about the optical axis OA.

With respect to a rotational direction of the drive ring 300, a direction along which the diaphragm blade 100 is moved toward the optical OA by moving the first cam groove 330 due to the rotation of the drive ring 300 is assumed as the diaphragm rotational direction ROT.

In the optical diaphragm device 10 according to the embodiment 1, the first cam grooves 330 having such inclination are formed. Accordingly, when the drive ring 300 is rotated in the diaphragm rotational directional ROT, the position of the moving boss 130 inserted into the first cam groove 330 formed in the drive ring 300 is moved in a direction that the moving boss 130 approaches the optical axis OA. Due to such a configuration, a length of the first cam groove 330 can be shortened compared to the configuration where the inclination direction of the first cam groove 330 is set in an opposite manner.

Accordingly, the number of first cam grooves 330 can be easily increased. As a result, it is possible to provide an optical diaphragm device where the number of diaphragm blades can be further easily increased.

(5) Angle Made by First Cam Groove 330 and Circumferential Direction and Angle Made by Second Cam Groove 230 and Circumferential Direction As shown in FIG. 2A, FIG. 4A and the like, in the optical diaphragm device 10 according to the embodiment 1, an angle made by the second cam groove 230 and the circumferential direction is set larger than an angle made by the first cam groove 330 and the circumferential direction. That is, the second cam groove 230 makes a large (deep) angle with respect to the circumferential direction, and the first cam groove 330 makes a small (shallow) angle with respect to the circumferential direction.

With such a configuration, it is possible to make a track of the second cam groove 230 (a moving path of the moving boss 130) further approximate an arc which the moving boss 130 draws when the moving boss 130 is rotated about the first fixing boss 120. Accordingly, compared to the case where an angle made by the second cam groove 230 and the circumferential direction is small (shallow) (in the case where such an angle being equal to or less than an angle made by the first cam groove 330 and the circumferential direction), a force with which the second cam groove 230 and the moving boss 130 come into contact with each other in the circumferential direction can be decreased and hence, the diaphragm blade 100 and the light leakage prevention blade 200 can be smoothly rotated.

(6) Lengths of First Cam Groove 330 and Second Cam Groove 230

As shown in FIG. 4A and FIG. 4B, in the optical diaphragm device 10 according to the embodiment 1, an extension length of the second cam groove 230 is shorter than an extension length of the first cam groove 330.

With such a configuration, it is possible to make the first cam groove 330 as close as possible to a full width of the drive ring 300 and hence, it is possible to increase an amount (stroke amount) of moving the blade toward the inner direction while effectively using the drive ring 300 having the narrow width.

Further, in the above-mentioned optical diaphragm device 10, it is sufficient to form the second cam groove 230 having a required minimum length and hence, the light leakage prevention blade 200 can also be formed in a compact shape. Such structure contributes to downsizing of the optical diaphragm device 10.

(7) Overlapping Between Outer Profile 115 of Diaphragm Blade 100 and Light Leakage Prevention Blade 200

Assuming that the second direction is defined as an upward direction, the diaphragm blade 100j out of "the diaphragm blade 100j and the light leakage prevention blade 200j which form the pair", the light leakage prevention blade 200j out of "the diaphragm blade 100j and the light leakage prevention blade 200j which form the pair", the diaphragm blade 100j+1 out of "the diaphragm blade 100j+1 and the light leakage prevention blade 200j+1 which form the succeeding pair" positioned adjacently to the diaphragm blade 100j and the light leakage prevention blade 200j which form the pair, and the light leakage prevention blade 200j+1 out of "the diaphragm blade 100j+1 and the light leakage prevention blade 200j+1 which form the succeeding pair" are arranged in an overlapping manner in this order (see FIG. 3, FIG. 6A and FIG. 6B and the like).

The optical diaphragm device 10 is formed such that in viewing the optical diaphragm device along the optical axis OA, a portion of the outer profile 115 of the diaphragm blade 100j+1 out of "the diaphragm blade 100j+1 and the light leakage prevention blade 200$j$+1 which form the succeeding pair" always overlaps with the light leakage prevention blade 200$j$ out of "the diaphragm blade 100$j$ and the light leakage prevention blade 200$j$ which form the pair".

For example, also in FIG. 6A and FIG. 6B, it is understood that the outer profile 115 of the diaphragm bade 100 "always overlaps with" the light leakage prevention blade 200. That is, in a case where the optical diaphragm device is in a fully open state, a portion of the outer profile 115 on a distal end side of a diaphragm blade 100$j$+1 side (a side opposite to the first fixing boss 120) overlaps with the light leakage prevention blade 200$j$. In a case where the optical diaphragm device is in a minimum aperture state, a portion of the outer profile 115 on a first fixing boss 120 side of the diaphragm blade 100$j$+1 overlaps with the light leakage prevention blade 200$j$. Also in an intermediate state between the fully open state and the minimum aperture state, the diaphragm blade 100 overlaps with the light leakage prevention blade 200.

In this embodiment, "outer profile 115" of the diaphragm blade 100 refers to a profile of the diaphragm blade 100 on a side remotest in distance from the optical axis OA with respect to the profile of the diaphragm blade 100 when the diaphragm blade 100 is viewed along the optical axis OA in a state where the aperture diameter of the diaphragm aperture is set to a maximum value (fully open state).

The optical diaphragm device 10 is formed such that in a state where the aperture diameter AD of the diaphragm aperture assumes a minimum value, a portion of the outer profile 115 of the diaphragm blade 100$j$+1 overlaps with the light leakage prevention blade extending portion 250 of the light leakage prevention blade 200$j$ out of "the diaphragm blade 100$j$ and the light leakage prevention blade 200$j$ which form the pair" while maintaining the overlapping order (see FIG. 6B).

In the optical diaphragm device 10 according to the embodiment 1, the portion of the outer profile 115 of the diaphragm blade 100$j$+1 out of "the diaphragm blade 100$j$+1 and the light leakage prevention blade 200$j$+1 which form the succeeding pair" always overlaps with the light leakage prevention blade 200$j$ out of "the diaphragm blade 100$j$ and the light leakage prevention blade 200$j$ which form the pair". Accordingly, the outer profile 115 of the diaphragm blade 100$j$+1 falls within a range of the light leakage prevention blade 200$j$ and hence, it is possible to prevent the occurrence of a case where the diaphragm blade 100$j$+1 falls out from the light leakage prevention blade 200$j$ and is disposed on the same stage as the light leakage prevention blade 200$j$ or the occurrence of a case where the diaphragm blade 100$j$+1 sinks below the light leakage prevention blade 200$j$ thus causing an exchange of the overlapping order of the blades.

Further, even in a case where the aperture diameter of the diaphragm aperture assumes a minimum value which is a state where the order of the blades is most likely to exchange (minimum diaphragm state), in the optical diaphragm device 10 of the embodiment 1, the portion of the outer profile 115 of the diaphragm blade 100$j$+1 overlaps with the light leakage prevention blade extending portion 250 of the light leakage prevention blade 200$j$ out of "the diaphragm blade 100$j$ and the light leakage prevention blade 200$j$ which form the pair". Accordingly, the outer profile 115 of the diaphragm blade 100$j$+1 falls within a range of the light leakage prevention blade extending portion 250 of the light leakage prevention blade 200$j$ and hence, it is possible to prevent the occurrence of a case where the diaphragm blade 100$j$+1 falls out from the light leakage prevention blade 200$j$ and is disposed on the same stage as the light leakage prevention blade 200$j$ or the occurrence of a case where the diaphragm blade 100$j$+1 sinks below the light leakage prevention blade 200$j$ thus causing an exchange of the overlapping order of the blades.

With such a configuration, the optical diaphragm device 10 according to the embodiment 1 can maintain the overlapping order of the diaphragm blade 100 and the light leakage prevention blade 200.

Embodiment 2

Next, an optical diaphragm device 10$a$ according to an embodiment 2 is described with reference to FIG. 7 to FIG. 8B.

FIG. 7 is a perspective view for describing a main part of the optical diaphragm device 10$a$ according to the embodiment 2. In FIG. 7, "the diaphragm blade 100$j$ and the light leakage prevention blade 200$j$ which form the pair", the diaphragm blade 100$j$+1 and the light leakage prevention blade 200$j$+1 which form the succeeding pair positioned adjacently to "the diaphragm blade 100$j$ and the light leakage prevention blade 200$j$ which form the pair", and the intermediate blade 280$j$ are shown. Portions of the drive ring 300 and the housing body 400 which correspond to "the diaphragm blade 100$j$ and the light leakage prevention blade 200$j$ which form the pair", the diaphragm blade 100$j$+1 and the light leakage prevention blade 200$j$+1 which form the succeeding pair positioned adjacently to "the diaphragm blade 100$j$ and the light leakage prevention blade 200$j$ which form the pair", and the intermediate blade 280$j$ are shown by spotlighting these constitutional elements. Other constitutional elements are omitted from the drawing. Symbol 212 indicates an outer periphery of a second blade portion 210.

Figure 8A:
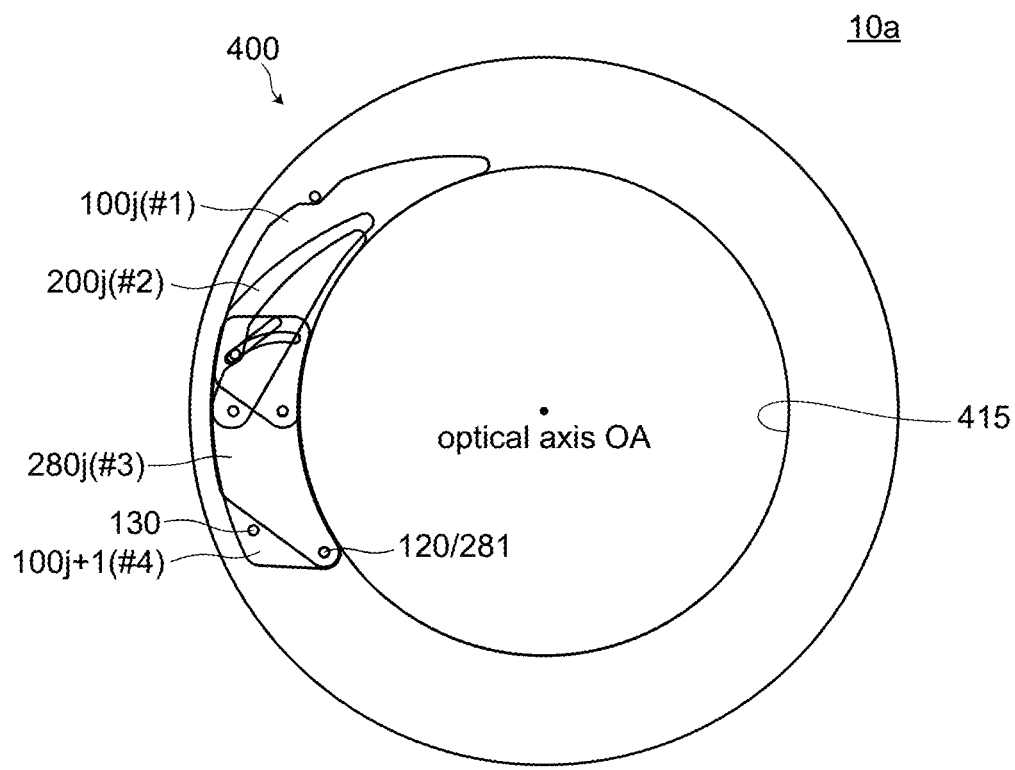
FIG. 8A and FIG. 8B are plan views for describing a manner of operation and an advantageous effect acquired by the optical diaphragm device 10a according to the embodiment 2.
Figure 8B:
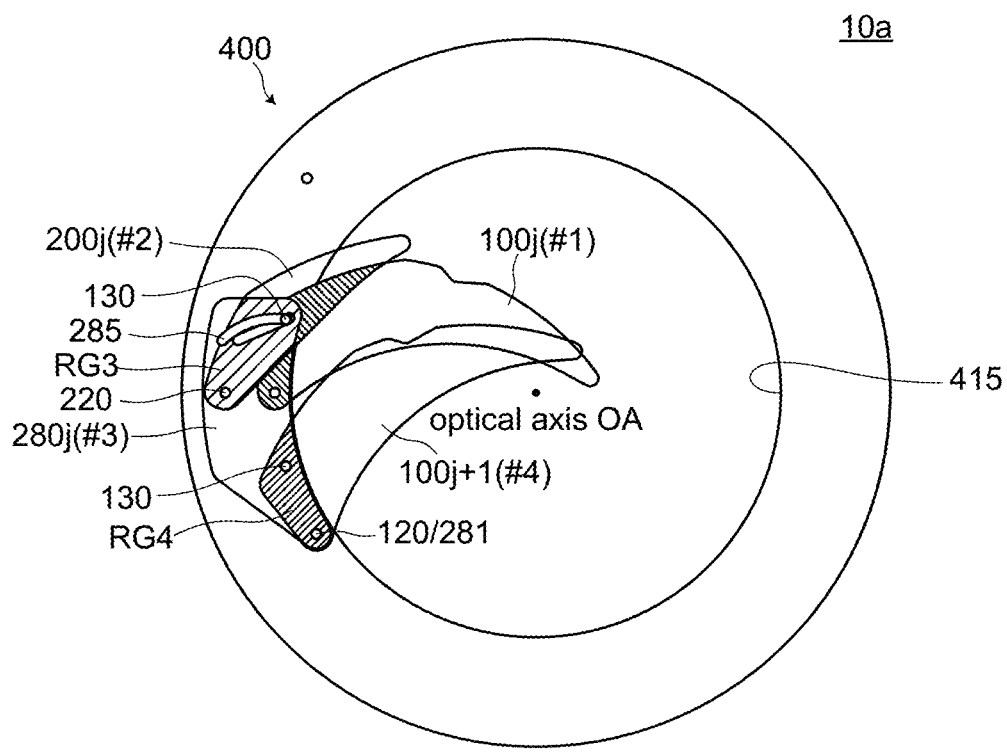

FIG. 8A and FIG. 8B are plan views for describing a manner of operation and an advantageous effect acquired by the optical diaphragm device 10$a$ according to the embodiment 2. FIG. 8A shows a state (fully open state) where an aperture diameter of a diaphragm aperture is set to a maximum value, and FIG. 8B shows a state (minimum aperture state) where the aperture diameter of the diaphragm aperture is set to a minimum value. In FIG. 8A and FIG. 8B, only "the diaphragm blade 100$j$ and the light leakage prevention blade 200$j$ which form the pair", the diaphragm blade 100$j$+1 out of "the diaphragm blade 100$j$+1 and the light leakage prevention blade 200$j$+1 which form the succeeding pair" positioned adjacently to "the diaphragm blade 100$j$ and the light leakage prevention blade 200$j$ which form the pair", and the intermediate blade 280$j$ are shown. Other diaphragm blades, light leakage prevention blades and the like are omitted from the drawing.

The optical diaphragm device 10$a$ according to the embodiment 2 has basically substantially the same configuration as the optical diaphragm device 10 according to the embodiment 1. However, the optical diaphragm device 10$a$ according to the embodiment 2 differs from the optical diaphragm device 10 according to the embodiment 1 with respect to a point that the optical diaphragm device 10$a$ includes an intermediate blade 280 in place of or in addition to a light leakage prevention blade extending portion 250.

1. Configuration of Optical Diaphragm Device 10$a$ According to Embodiment 2

(1) Intermediate Blade 280$j$

As shown in FIG. 7, the optical diaphragm device 10$a$ according to the embodiment 2 further includes an intermediate blade 280$j$ disposed between the light leakage prevention blade 200$j$ and the diaphragm blade 100$j$+1 ("j" is a variable used as an index, and takes an integer of 1 or more.

In the description made hereinafter, there are cases where the intermediate blade 280j is simply expressed as the intermediate blade 280, or the description is made by omitting affixing the variable j).

In this embodiment, "intermediate" means an intermediate as viewed from a viewpoint of the order of overlapping the blades along the second direction.

The intermediate blade 280 may be made of any material, and it is preferable that the intermediate blade 280 be made of a slippery material which allows the intermediate blade 280 to mate with and to smoothly slide on other constitutional elements (the diaphragm blade 100 and the light leakage prevention blade 200).

The intermediate blade 280 is fixed to the housing body 400 in a state where the intermediate blade 280 does not interfere with the movement of the diaphragm blade 100 and the movement of the light leakage prevention blade 200.

It is necessary that the intermediate blade 280 falls within a width of the housing body 400 as viewed along an optical axis OA when at least the optical diaphragm device 10a is in a fully open state. During a process where the diaphragm aperture is advancing in the closing direction, the intermediate blade 280 may go beyond the width of the housing body 400 so long as the intermediate blade 280 does not obstruct the aperture diameter. However, it is more preferable that the intermediate blade 280 is fixed to the housing body 400.

Next, a method of fixing the intermediate blade 280 is described.

For example, as shown in FIG. 7, firstly, a loose hole 281 having an inner diameter sufficiently large compared to a diameter of the first fixing boss 120 is formed in the third planar plate 282 of the intermediate blade 280 at a position corresponding to the first fixing boss 120 of the diaphragm blade 100j+1, and a third cam groove 285 having the same shape as a trajectory of the moving boss 130 is formed in the third planar plate 282 of the intermediate blade 280 such that the shape of the third cam groove 285 corresponds to a curved line/straight line which a moving path (trajectory) of the moving boss 130 of the diaphragm blade 100j draws.

Then, one end of the intermediate blade 280 is fixed to the housing body 400 together with the diaphragm, blade 100j+1 using the first fixing boss 120 of the diaphragm blade 100j+1, the loose hole 281 of the intermediate blade 280, and the first hole 401j+1 of the housing body 400. In the process of assembling the plurality of blades, the moving boss 130 of the diaphragm blade 100j is inserted into not only the second cam groove 230 of the light leakage prevention blade 200j but also the third cam groove 285 of the intermediate blade 280. Since the third cam groove 285 of the intermediate blade 280 is restricted by the above-mentioned moving boss 130, the other end of the intermediate blade 280 is also substantially fixed to the housing body 400.

With such a configuration, the intermediate blade 280 can be substantially fixed to the housing body 400 by making use of the existing constitutional elements (the first fixing boss 120 and the moving boss 130) without using an additional boss, an additional screw or the like.

In this embodiment, it is sufficient that fixing of the intermediate blade 280 is performed roughly, and the presence of a slight play (a margin in size) may be allowed. For example, by allowing the third cam groove 285 to have a slight play, even when the moving path (trajectory) of the moving boss 130 fluctuates, it is possible to prevent the third cam groove 285 from interfering with the movement of the moving boss 130 or causing a dead lock of the moving boss 130.

(2) Overall Configuration

Assuming that the second direction is defined as an upward direction, the diaphragm blade 100j out of "the diaphragm blade 100j and the light leakage prevention blade 200j which form the pair", the light leakage prevention blade 200j out of "the diaphragm blade 100j and the light leakage prevention blade 200j which form the pair", the intermediate blade 280j, the diaphragm blade 100j+1 out of "the diaphragm blade 100j+1 and the light leakage prevention blade 200j+1 which form the succeeding pair" positioned adjacently to "the diaphragm blade 100j and the light leakage prevention blade 200j which form the pair", and the light leakage prevention blade 200j+1 out of "the diaphragm blade 100j+1 and the light leakage prevention blade 200j+1 which form the succeeding pair" are arranged in an overlapping manner in the upward direction an this order.

The optical diaphragm device 10a is formed such that in viewing the optical diaphragm device 10a along the optical axis OA, the intermediate blade 280j and the light leakage prevention blade 200j out of "the diaphragm blade 100j and the light leakage prevention blade 200j which form the pair" always overlap with each other. Further, the optical diaphragm device 10a is formed such that the intermediate blade 280j and the diaphragm blade 100j+1 out of "the diaphragm blade 100j+1 and the light leakage prevention blade 200j+1 which form the succeeding pair" always overlap with each other (see also FIG. 8A and FIG. 8B).

The optical diaphragm device 10a according to the embodiment 2 also, substantially in the same manner, includes the diaphragm blade 100, the light leakage prevention blade 200 having the second cam groove 230, the drive ring 300, the housing body 400 and the like of the embodiment 1. Accordingly, the description of these constitutional elements in the embodiment 1 is used in the embodiment 2, and the description of these constitutional element is omitted in the embodiment 2.

2. Manner of Operation and Advantageous Effects of Optical Diaphragm Device 10a According to Embodiment 2

The optical diaphragm device 10a of the embodiment 2 further includes the intermediate blade 280 disposed between the light leakage prevention blade 200j and the diaphragm blade 100j+1, and the optical diaphragm device 10a is formed such that the intermediate blade 280 and the light leakage prevention blade 200j out of "the diaphragm blade 100j and the fight leakage prevention blade 200j which form the pair" always overlap with each other.

With the introduction of the intermediate blade 280, as shown in FIG. 8B, for example, even when the optical diaphragm device 10a is brought into a minimum aperture state, the light leakage prevention blade 200j (#2) out of "the diaphragm blade 100j (#1) and the light leakage prevention blade 200j (#2) which form the pair" and the intermediate blade 280 (#3) which is disposed above the light leakage prevention blade 200j (#2) overlap with each other in a third region RG3. In this manner, the region where the intermediate blade 280j (#3) and the light leakage prevention blade 200j (#2) overlap with each other is ensured and hence, the intermediate blade 280j (#3) is inevitably disposed on the stage above the light leakage prevention blade 200j (#2).

Further, the optical diaphragm device 10a is formed such that the intermediate blade 280j (#3) and the diaphragm blade 100j+1 (#4) out of "the diaphragm blade 100j+1 (#4) and the light leakage prevention blade 200j+1 which form the succeeding pair" always overlap with each other.

For example, even when the optical diaphragm device 10a is brought into a minimum aperture state, the intermediate blade 280j (#3) and the diaphragm blade 100j+1 (#4) which is disposed on the stage above the intermediate blade 280j (#3) overlap with each other in a fourth region RG4 (see FIG. 8B). In this manner, a region where the diaphragm blade 100j+1 (#4) and the intermediate blade 280j (#3) overlap with each other is ensured and hence, the diaphragm blade 100j+1 (#4) is inevitably disposed on a stage above the intermediate blade 280j (#3).

In this manner, it is possible to maintain the overlapping order (#1 to #4) of the blades where the diaphragm blade 100j (#1), the light leakage prevention blade 200j (#2), the intermediate blade 280j (#3), and the diaphragm blade 100j+1 (#4) overlap with each other in this order from below to above.

The above-mentioned overlapping is guaranteed not only in the process from the fully open state shown in FIG. 8A to the state shown in FIG. 8B but also in the process performed in a reversed manner.

In this manner, it is promised that the diaphragm blade 100j+1 (#4) is inevitably disposed on a stage above the light leakage prevention blade 200j (#2) by way of the intermediate blade 280j (#3) and hence, the optical diaphragm device 10a of the embodiment 2 can maintain the overlapping order of diaphragm blade 100 and light leakage prevention blade 200.

The optical diaphragm device 10a according to the embodiment 2 has substantially the same configuration as the optical diaphragm device 10 according to the embodiment 1 except for the point that the optical diaphragm device 10a includes the intermediate blade 280 in place of or in addition to the light leakage prevention blade extending portion 250. Accordingly, the optical diaphragm devices 10a according to the embodiment 2 acquires the corresponding advantageous effects found amongst all advantageous effects which the optical diaphragm device 10 according to the embodiment 1 acquires.

Embodiment 3

Figure 9:
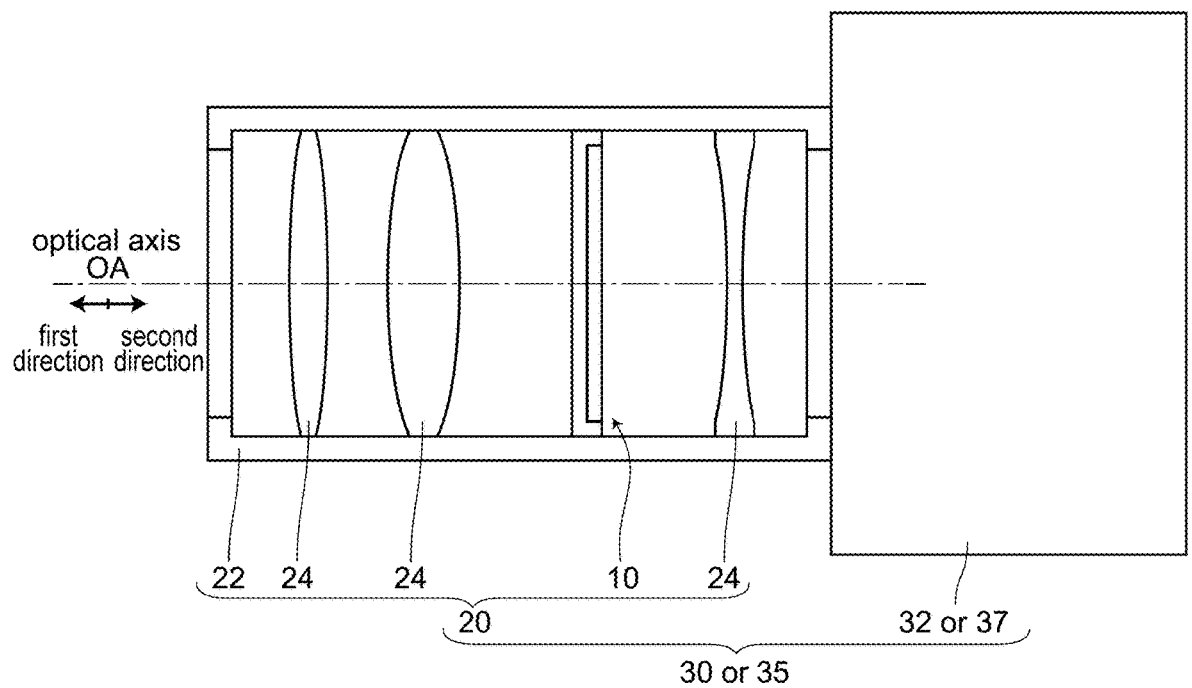
FIG. 9 is a schematic view for describing a lens barrel 20 according to an embodiment 3 and an imaging device 30 or a projection device 35 according to an embodiment 4.

FIG. 9 is a schematic view for describing a lens barrel 20 according to an embodiment 3 and an imaging device 30 or a projection device 35 according to an embodiment 4.

As shown in FIG. 9, in the lens barrel 20 according to the embodiment 3, the optical diaphragm device 10 according to the embodiment 1 and a plurality of lenses 24 are housed.

The lens barrel 20 according to the embodiment 3 includes the optical diaphragm device 10 according to the embodiment and hence, it is possible to provide the lens barrel 20 where large-sizing of the lens barrel 20 can be suppressed, and a favorable imaging state can be acquired.

In the embodiment 3, the optical diaphragm device 10a according to the embodiment 2 can be adopted in place of the optical diaphragm device 10 according to the embodiment 1.

Embodiment 4

As shown in FIG. 9, an imaging device 30 according to the embodiment 4 includes: the optical diaphragm device 10 according to the embodiment 1 or the lens barrel 20 according to the embodiment 3, and an imaging device body 32. The imaging device 30 according to the embodiment 4 is applicable to a camera or the like, for example.

As shown in FIG. 9, a projection device 35 according to the embodiment 4 includes the optical diaphragm device 10 according to the embodiment 1 or the lens barrel 20 according to the embodiment 3; and a projection device body 37. The projection device 35 according to the embodiment 4 is applicable to a projector or the like, for example.

The imaging device 30 or the projection device 35 according to the embodiment 4 includes: the optical diaphragm device 10 according to the embodiment 1 or the lens barrel 20 according to the embodiment 3. With such a configuration, large-sizing of the imaging device 30 or the projection device 35 can be suppressed. It is also possible to provide the imaging device 30 where a favorable imaging state can be acquired, or the projection device 35 where a favorable projection state can be acquired.

In the embodiment 4, the optical diaphragm device 10a according to the embodiment 2 may be applicable in place of the optical diaphragm device 10 according to the embodiment 1.

Although the present invention has been described based on the above-mentioned embodiments, the present invention is not limited to the above-mentioned embodiments, and the present invention can be carried out without departing from the gist of the present invention, for example, the following modifications are also conceivable.

(1) The numbers, the materials, the shapes, the positions, the sizes and the like or the constitutional elements described in the above-mentioned embodiments are provided only for an exemplifying purpose, and these can be changed within ranges where advantageous effects of the present invention are not impaired.

(2) In the optical diaphragm device 10 according to the embodiment 1 and the optical diaphragm device 10a according to the embodiment 2, the description has been made by taking into account the case where the optical diaphragm device is used in the imaging device such as a camera as an application field. However, the present invention is not limited to such an example, and is also applicable to a projection device such as a projector, for example.

(3) In the embodiment 1 and the embodiment 2, "bosses" named as the first fixing boss 120, the second fixing boss 220, and the moving boss 130 are respectively formed of a circular cylindrical (circular columnar) body having a fixed radius. However, the bosses are not limited to such a configuration. It is sufficient that the first fixing boss 120 and the second fixing boss 220 have the shape which allows them to be formed as a rotary shaft. It is sufficient that the moving boss 130 be inserted through the first cam groove 330 and the second cam groove 230 and be capable of transmitting a force. For example, the moving boss 130 may be formed of a lead line having a radius or approximately 0, a conical shaped member, a mushroom shape member or the like.

(4) With respect to the diaphragm blade 100 of the embodiment, as shown in FIG. 1A to FIG. 6B, the description has been made by taking the case where the distal end of the diaphragm blade 100 is positioned in the aperture 413 of the optical diaphragm device 10 when the diaphragm blade 100 is brought into a minimum aperture state. However, the present invention is not limited to such a configuration. For example, it may be possible to adopt a diaphragm blade 100b of an elongated shape having a longitudinal axis as a whole and where a diaphragm blade extending portion is disposed on the other side in the longitudinal axis direction of the diaphragm blade 100b (modification 1).

Figure 10A:
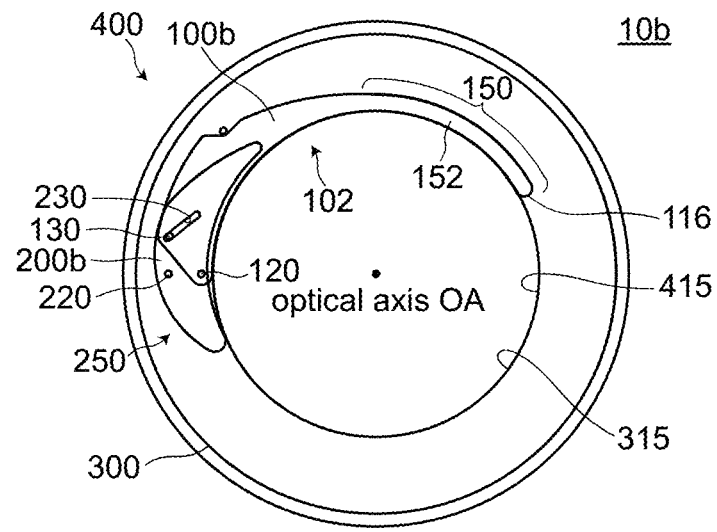
Figure 10B:
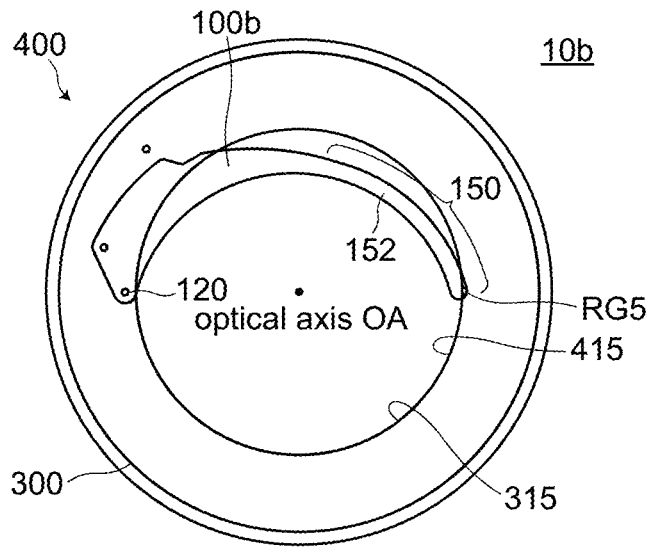
Figure 10C:
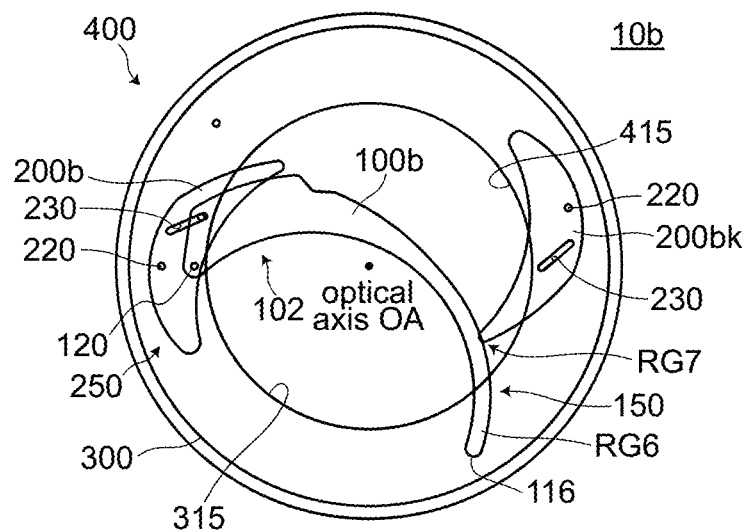

FIG. 10A to FIG. 10C are plan views for describing an optical diaphragm device 10b according to a modification 1. FIG. 10A shows a diaphragm blade 100b and a light leakage prevention blade 200b in a state (fully open state) where an aperture diameter of a diaphragm aperture is set to a maximum value, and FIG. 10C shows the diaphragm blade 100b, the light leakage prevention blade 200b, and a light leakage prevention blade 200bk "positioned on a side opposite to the first fixing boss 120 with the optical axis OA sandwiched between the first fixing boss 120 and the light leakage prevention blade 200bk as viewed from the first fixing boss 120 of the diaphragm blade 100b" in a state (minimum aperture state) where the aperture diameter of the diaphragm aperture is set to a minimum value. FIG. 10B shows the diaphragm blade 100b in an intermediate state between the fully open state and the minimum aperture state. Other diaphragm blades, light leakage prevention blades and the like are omitted from the drawing.

In the optical diaphragm device 10b of the modification 1, as shown in FIG. 10A to FIG. 10C, the diaphragm blade 100b is formed of a first planar plate 102 of an elongated shape having a longitudinal axis as a whole.

A first fixing boss 120 is formed on one side of the first planar plate 102 of the diaphragm blade 100b in the longitudinal axis direction and a diaphragm blade extending portion 150 is formed on the other side of the first planar plate 102 of the diaphragm blade 100b in the longitudinal axis direction.

Figure 1B:
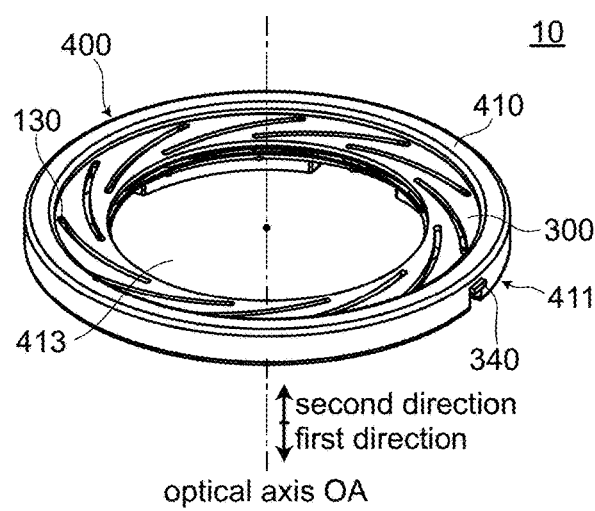

The diaphragm blade extending portion 150 has an inner periphery 152 formed in a shape substantially equal to a shape of a portion of the diaphragm aperture in a state where the aperture diameter of the diaphragm aperture assumes a maximum value (approximately circular shape, see FIG. 1B, for example).

A portion of the diaphragm blade extending portion 150 which is formed to be disposed on a more outer peripheral side than at least the inner periphery 152 is always positioned outside a housing body inner periphery 415 which is an inner periphery of the housing body 400 or is always positioned outside a drive ring inner periphery 315 which is an inner periphery of the drive ring 300 (see a fifth region RG5 in FIG. 10B and a six region RG6 in FIG. 10C). In this modification 1, the direction extending away from she optical axis OA is defined as "outward" (the same definition being also applicable in a modification 2 and a modification 3 described hereinafter).

In viewing the optical diaphragm device 10b along the optical axis OA, at least a portion of the diaphragm blade extending portion 150 of the diaphragm blade 100b always overlaps with the light leakage prevention blade 200bk positioned on a side opposite to the first fixing boss 120 with the optical axis OA sandwiched between the first fixing boss 120 and the light leakage prevention blade 200bk as viewed from the first fixing boss 120 of the diaphragm blade 100b (see a seventh region RG7 in FIG. 10C).

In a state where the aperture diameter of the diaphragm aperture assumes a maximum value, a portion of the diaphragm blade extending portion 150 of the diaphragm blade 100b overlaps with the light leakage prevention blade extending portion 250 of the light leakage prevention blade 200bk positioned on the above-mentioned opposite side.

In this modification, "a side opposite to the first fixing boss 120 with the optical axis OA sandwiched between the first fixing boss 120 and the light leakage prevention blade 200bk as viewed from the first fixing boss 120 of the diaphragm blade 100b" is not always necessary to be strictly a side opposite to the first fixing boss 120 with respect to the optical axis OA by 180°, and it is sufficient that the light leakage prevention blade 200bk may be disposed in a region opposite to the first fixing boss 120 by an angle exceeding 90° (the same definition being also applicable in the modification 2 and the modification 3 described hereinafter).

As described above, in the optical diaphragm device 10b of the modification 1, the diaphragm blade extending portion 150 is formed on the diaphragm blade 100b, and at least the portion of the diaphragm blade extending portion 150 of the diaphragm blade 100b always overlaps with the light leakage prevention blade 200bk positioned on the side opposite to the first fixing boss 120 with the optical axis OA sandwiched between the first fixing boss 120 and the light leakage prevention blade 200bk as viewed from the first fixing boss 120 of the diaphragm blade 100b, and in a state where the aperture diameter of the diaphragm aperture assumes the maximum value, the portion of the diaphragm blade extending portion 150 of the diaphragm blade 100b overlaps with the light leakage prevention blade extending portion 250 of the light leakage prevention blade 200bk positioned on the opposite side.

With such a configuration, it is possible to prevent the occurrence of a case where a distal end 116 side of the diaphragm blade extending portion 150 sinks below the light leakage prevention blade 200bk positioned on the side opposite to the first fixing boss 120 with the optical axis OA sandwiched between the first fixing boss 120 and the light leakage prevention blade 200bk as viewed from the first fixing boss 120 of the diaphragm blade 100b thus causing an exchange of the overlapping order of the blades. Accordingly, the overlapping order of the diaphragm blade 100 and the light leakage prevention blade 200 can be maintained.

Further, as described above, in the optical diaphragm device 10b of the modification 1, the portion of the diaphragm blade extending portion 150 which is formed to be disposed on the more outer peripheral side than at least the inner periphery 152 is always positioned outside the housing body inner periphery 415 which is the inner periphery of the housing body 400 or is always positioned outside the drive ring inner periphery 315.

Accordingly, with respect to the diaphragm blade 100b, as in the case of a both-end supported beam, it is possible to make the diaphragm blade 100b stride over an opening of the housing body 400 or an opening of the drive ring 300 such that the diaphragm blade 100b is supported by the housing body inner periphery 415 or the drive ring inner periphery 315 on a first fixing boss 120 side and the distal end 116 side of the diaphragm blade extending portion 150. Accordingly, it is possible to prevent the occurrence of a phenomenon that distal end sides of the plurality of diaphragm blades are raised toward the diaphragm aperture in a knitted manner. Accordingly, a quality of the optical diaphragm device in external appearance can be enhanced.

(5) With respect to the diaphragm blade 100 of the embodiment 2, as shown in FIG. 7 to FIG. 8B, the description has been made by taking the diaphragm blade 100 having the configuration where the distal end of the diaphragm blade 100 is positioned in the aperture 413 of the optical diaphragm device 10a when the diaphragm blade 100 is brought into a minimum aperture state as an example. However, the present invention is not limited to such a configuration. For example, it may be possible to adopt a diaphragm blade 100c of an elongated shape having a longitudinal axis as a whole and where a diaphragm blade extending portion is disposed on the other side in the longitudinal axis direction of the diaphragm blade 100c (modification 2).

Figure 11A:
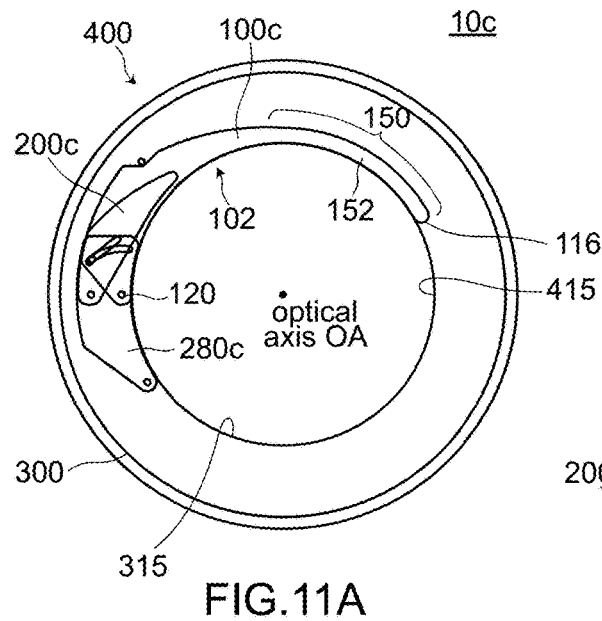
Figure 11C:
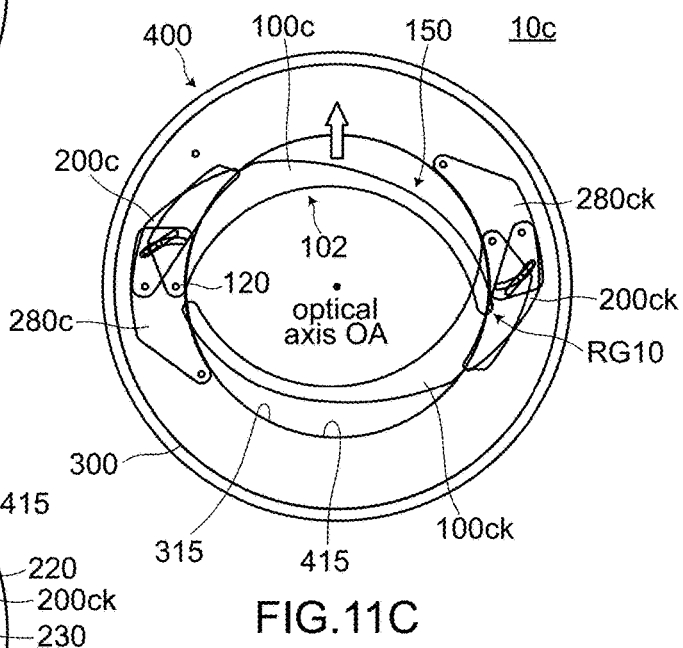
Figure 11B:
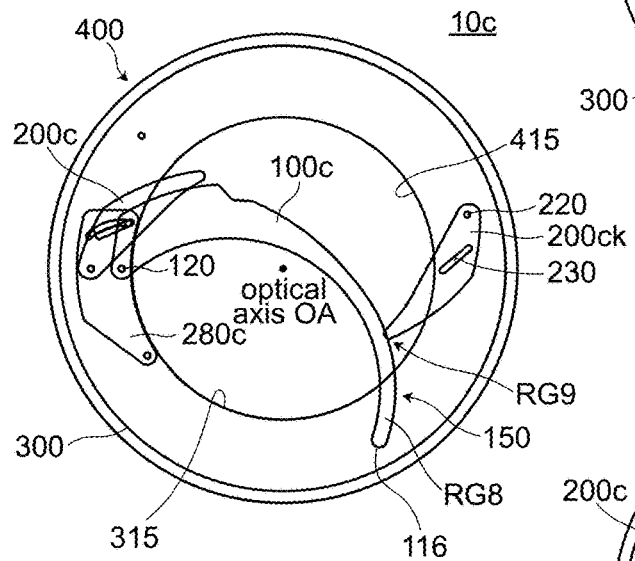
Figure 11D:
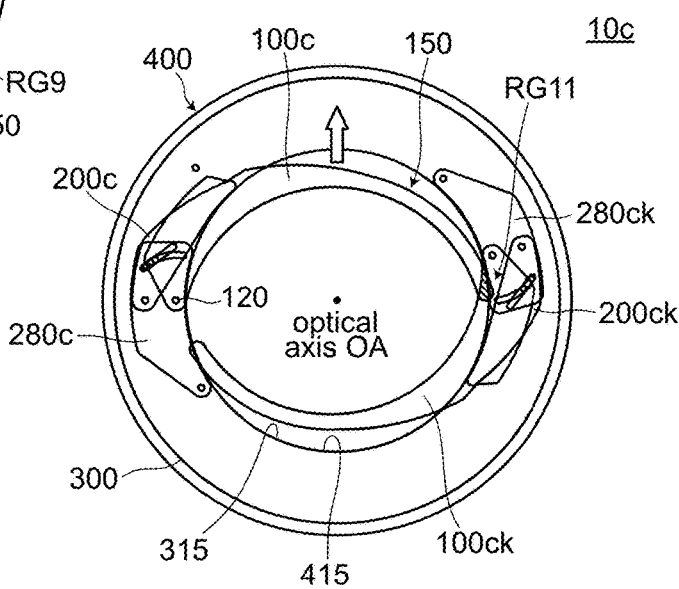

FIG. 11A to FIG. 11D are plan views for describing an optical diaphragm device 10c according to a modification 2. FIG. 11A shows a state (fully open state) where an aperture diameter of a diaphragm aperture is set to a maximum value, FIG. 11B shows a state where the aperture diameter of the diaphragm aperture is set to a minimum value (minimum aperture state). FIG. 11C shows a diaphragm blade 100c in an intermediate state where the diaphragm blade 100c is moving from a minimum aperture state to a fully open state. FIG. 11D shows a state where the diaphragm blade 100c is further moving toward a fully open state from the state shown in FIG. 11C. In FIG. 11A to FIG. 11D, only the blades necessary for the description are shown, and other diaphragm blades, light leakage prevention blades and the like are omitted from the drawing.

In the diaphragm blade 100c and a diaphragm blade 100ck of the optical diaphragm device 10c according to the modification 2, as shown in FIG. 11A to FIG. 11D, the diaphragm blade is formed of the first planar plate 102 of an elongated shape having a longitudinal axis as a whole.

The first fixing boss 120 is formed on one side of the first planar plate 102 of the diaphragm blade 100c and one side of the first planar plate 102 of the diaphragm blade 100ck in the longitudinal axis direction respectively and a diaphragm blade extending portion 150 is formed on the other side of the first planar plate 102 of the diaphragm blade 100c and the other side of the first planar plate 102 of the diaphragm blade 100ck in the longitudinal axis direction respectively.

The diaphragm blade extending portion 150 has an inner periphery 152 formed in a shape substantially equal to a shape of a portion of the diaphragm aperture in a state where the aperture diameter of the diaphragm aperture assumes a maximum value (approximately circular shape, see FIG. 1B, for example).

A portion of the diaphragm blade extending portion 150 which is formed to be disposed on a more outer peripheral side than at least the inner periphery 152 is always positioned outside a housing body inner periphery 415 which is an inner periphery of the housing body 400 or is always positioned outside a drive ring inner periphery 315 which is an inner periphery of the drive ring 300 (see an eighth region RG8 in FIG. 11B and a tenth region RG10 in FIG. 11C).

The optical diaphragm device 10c is formed such that in viewing the optical diaphragm device 10c along the optical axis OA, in a state where the aperture diameter of the diaphragm aperture assumes a minimum value, a portion of the diaphragm blade extending portion 150 of the diaphragm blade 100c overlaps with the light leakage prevention blade 200ck positioned on the side opposite to the first fixing boss 120 with the optical axis OA sandwiched between the first fixing boss 120 and the light leakage prevention blade 200ck as viewed from the first fixing boss 120 of the diaphragm blade 100c (see a ninth region RG9 in FIG. 11B).

The optical diaphragm device 10c is formed such that in a process of transition of the aperture diameter of the diaphragm aperture from the minimum value to a maximum value (see FIG. 11B to FIG. 11D), the portion of the diaphragm blade extending portion 150 of the diaphragm blade 100c overlaps with the intermediate blade 280ck positioned on the side opposite to the first fixing boss 120 with the optical axis OA sandwiched between the first fixing boss 120 and the intermediate blade 280ck as viewed from the first fixing boss 120 of the diaphragm blade 100c (see an eleventh region RG11 in FIG. 11D).

As described above, in the optical diaphragm device 10c of the modification 2, the diaphragm blade extending portion 150 is formed on the diaphragm blade 100c, and in the state where the aperture diameter of the diaphragm aperture assumes the minimum value (a minimum aperture state), the portion of the diaphragm blade extending portion 150 of the diaphragm blade 100c overlaps with the light leakage prevention blade 200ck positioned on the side opposite to the first fixing boss 120 with the optical axis OA sandwiched between the first fixing boss 120 and the light leakage prevention blade 200ck as viewed from the first fixing boss 120 of the diaphragm blade 100c.

With such a configuration, it is possible to prevent the occurrence of a case where a distal end 116 side of the diaphragm blade extending portion 150 sinks below the light leakage prevent blade 200ck positioned on the side opposite to the first fixing boss 120 with the optical axis OA sandwiched between the first fixing boss 120 and the light leakage prevention blade 200ck as viewed from the first fixing boss 120 of the diaphragm blade 100c thus causing an exchange of the overlapping order of the blades.

Further, the optical diaphragm device 10c is formed such that, in a process of transition of the aperture diameter of the diaphragm aperture from the minimum value to the maximum value, the portion of the diaphragm blade extending portion 150 of the diaphragm blade 100c overlaps with the intermediate blade 280ck positioned on the side opposite to the first fixing boss 120 with the optical axis OA sandwiched between the first fixing boss 120 and the intermediate blade 280ck as viewed from the first fixing boss 120 of the diaphragm blade 100c. In other words, the optical diaphragm device 10c is formed such that, in the process of transition of the aperture diameter of the diaphragm aperture from the minimum value to the maximum value, the portion of the diaphragm blade extending portion 150 of the diaphragm blade 100c is transferred onto and overlaps with the intermediate blade 280ck positioned on the side opposite to the first fixing boss 120 with the optical axis OA sandwiched between the first fixing boss 120 and the intermediate blade 280ck as viewed from the first fixing boss 120 of the diaphragm blade 100c (see the eleventh region RG11 in FIG. 11D) from above the light leakage prevention blade 200ck positioned on the side opposite to the first fixing boss 120 with the optical axis OA sandwiched between the first fixing boss 120 and the light leakage prevention blade 200ck as viewed from the first fixing boss 120 of the diaphragm blade 100c (see the tenth region RG10 in FIG. 11C).

Accordingly, it is possible to prevent the occurrence of a case where a distal end 116 side of the diaphragm blade extending portion 150 is disposed on the same stage as the blade disposed on a stage further below the intermediate blade 280ck positioned on the side opposite to the first fixing boss 120 with the optical axis OA sandwiched between the first fixing boss 120 and the intermediate blade 280ck as viewed from the first fixing boss 120 of the diaphragm blade 100c, that is, a case where the distal end 116 side of the diaphragm blade extending portion 150 is positioned on the same stage as the diaphragm blade 100ck disposed on a stage below the intermediate blade 280ck (not shown in the drawing), or sinks below such a diaphragm blade 100ck (not shown in the drawing).

With such a configuration, the optical diaphragm device 10c according to the modification 2 can maintain the overlapping order of the diaphragm blade 100 and light leakage prevention blade 200.

As described above, the optical diaphragm device 10c of the modification 2 is formed such that the portion of the diaphragm blade extending portion 150 which is formed to be disposed on a more outer peripheral side than at least the inner periphery 152 is always positioned outside the housing body inner periphery 415 which is the inner periphery of the housing body 400 or is always positioned outside the drive ring inner periphery 315 which is the inner periphery of the drive ring 300.

Accordingly, with respect to the diaphragm blade 100c, as in the case of a both-end supported beam, it is possible to make the diaphragm blade 100c stride over an opening of the housing body 400 or an opening of the drive ring 300 such that the diaphragm blade 100c is supported by the housing body inner periphery 415 or the drive ring inner periphery 315 on a first fixing boss 120 side and a distal end 116 side of the diaphragm blade extending portion. Accordingly, it is possible to prevent the occurrence of a phenomenon that distal end sides of the plurality of diaphragm blades are raised toward the diaphragm aperture in a knitted manner. As a result, a quality of the optical diaphragm device in external appearance can be enhanced.

(6) In the embodiment 1 and the embodiment 2, the description has been made by taking the case where the distal end side of the diaphragm blade 100 is tapered as an example. However, the present invention is not limited to such a configuration. For example, it may be possible to adopt a diaphragm blade 100d which has a shape where a convex portion is formed on a distal end side of the diaphragm blade 100d (modification 3).

Figure 12A:
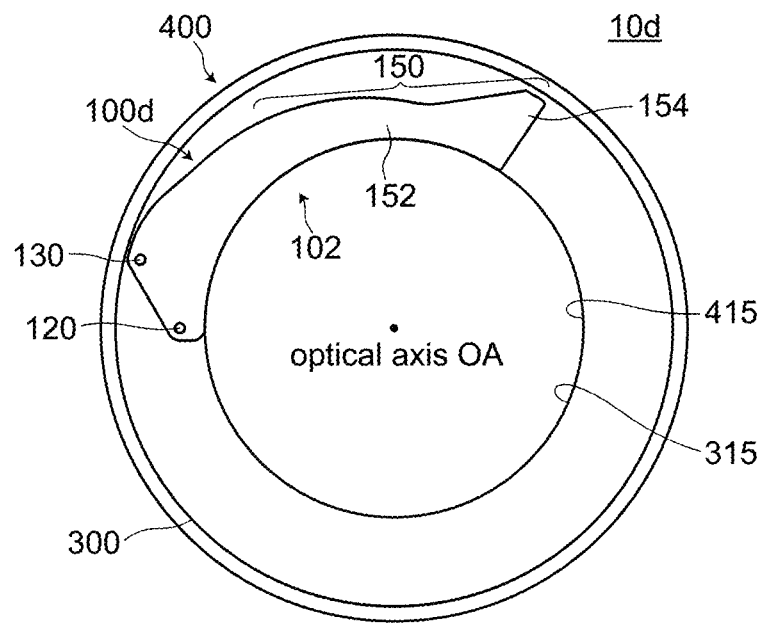
FIG. 12A and FIG. 12B are plan views for describing an optical diaphragm device 10d according to a modification 3.
Figure 12B:
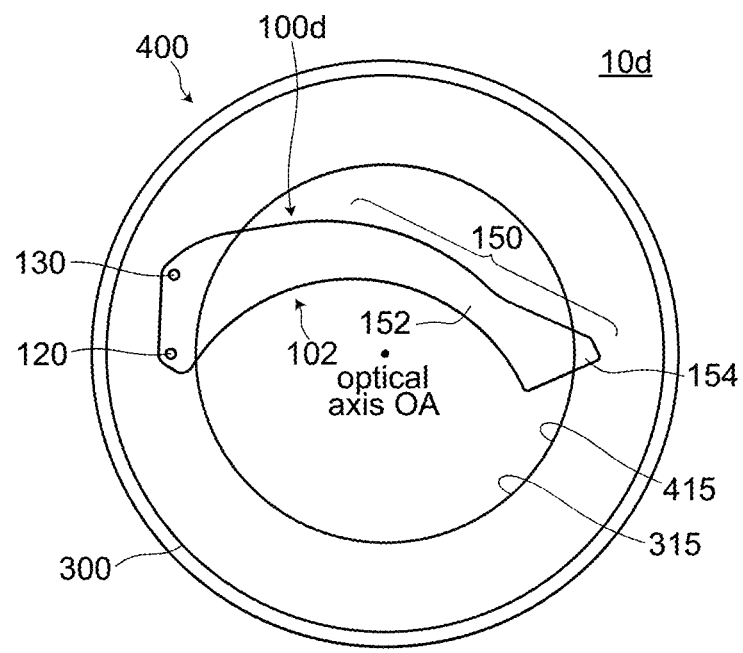

FIG. 12A and FIG. 12B are plan views for describing an optical diaphragm device 10d according to a modification 3. FIG. 12A shows the diaphragm blade 100d in a state (fully open state) where an aperture diameter of a diaphragm aperture is set to a maximum value (fully open state). FIG. 12B shows the diaphragm blade 100d in a state where the optical diaphragm device 10d is an intermediate state between a fully open state and a minimum aperture state. Other diaphragm blades, light leakage prevention blades and the like are omitted from the drawing.

As shown in FIG. 12A and FIG. 12B, the diaphragm blade 100d of the optical diaphragm device 10d according to the modification 3 is formed of the first planar plate 102 of an elongated shape having a longitudinal axis as a whole.

The first fixing boss 120 is formed on one side of the first planar plate 102 of the diaphragm blade 100d in the longitudinal axis direction and a diaphragm blade extending portion 150 is formed on the other side of the first planar plate 102 of the diaphragm blade 100d in the longitudinal axis direction.

The diaphragm blade extending portion 150 has an inner periphery 152 formed in a shape substantially equal to a shape of a portion of the diaphragm aperture in a state where the aperture diameter of the diaphragm aperture assumes a maximum value.

An engaging convex portion 154 which is always positioned outside a housing body inner periphery 415 which is an inner periphery of the housing body 400 or is always positioned outside a drive ring inner periphery 315 which is an inner periphery of the drive ring 300 and engages with the housing body inner periphery 415 or the drive ring inner periphery 315 is further formed on the diaphragm blade extending portion 150.

According to the modification 3, the engaging convex portion 154 which is always positioned outside the housing body inner periphery 415 which is the inner periphery of the housing body 400 or is always positioned outside the drive ring inner periphery 315 which is the inner periphery of the drive ring 300 and engages with the housing body inner periphery 415 or the drive ring inner periphery 315 is further formed on the diaphragm blade extending portion 150 formed in the diaphragm blade 100d.

With such a configuration, for example, even when the aperture diameter of the diaphragm aperture becomes small, with respect to the diaphragm blade 100d, as in the case of a both-end supported beam, it is possible to make the diaphragm blade 100d stride over the opening of the housing body 400 or the opening of the drive body 300 such that the diaphragm blade 100d is supported by the housing body inner periphery 415 on a first fixing boss 120 side and the engaging convex portion 154. Accordingly, it is possible to prevent the occurrence of a phenomenon that distal end sides of the plurality of diaphragm blades are raised toward the diaphragm aperture in a knitted manner. As a result, a quality of the optical diaphragm device in external appearance can be enhanced.

(7) In the embodiment 2, the description has been made by taking the method where the loose hole 281 and the third cam groove 285 are formed in the intermediate blade 280, and the intermediate blade 280 is fixed to the housing body 400 as an example. However, the present invention is not limited to such a configuration. For example, it may be possible to adopt a method where a fixing boss is formed on the intermediate blade per se (the modification 4 and the modification 5).

Figure 13A:
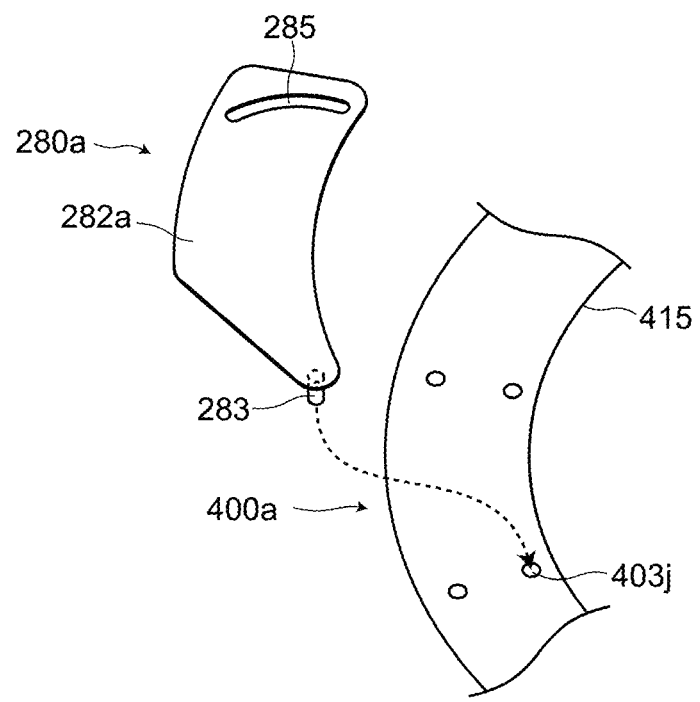
FIG. 13A and FIG. 13B are plan views for describing a fixing method of fixing an intermediate blade 280a according to a modification 4 and a fixing method of fixing an intermediate blade 280b according to a modification 5.
Figure 13B:
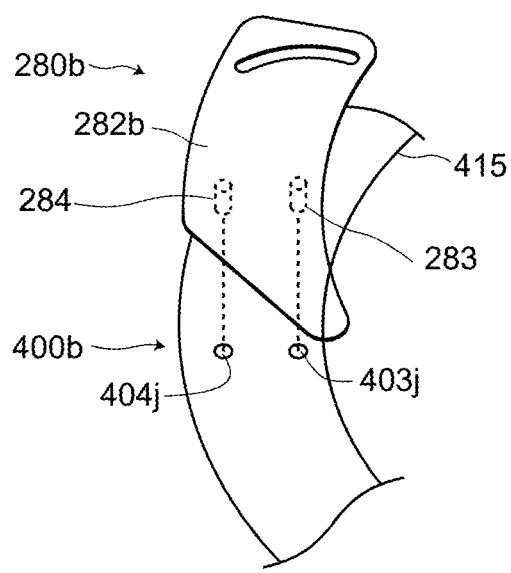
Figure 15:
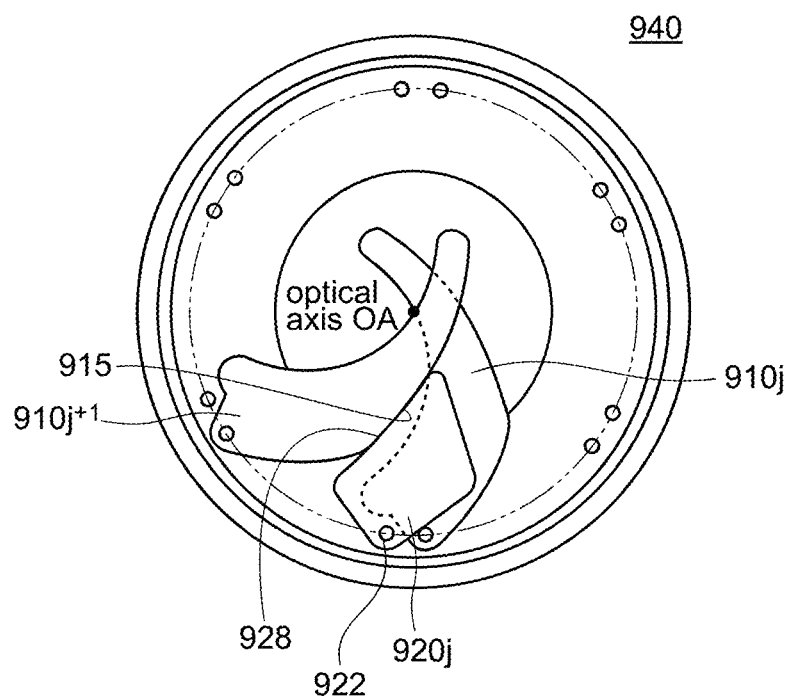
FIG. 15 is a plan view for describing one example of the conventional optical diaphragm device 900 where an overlapping order of a diaphragm blade 910 and a light leakage prevention blade 920 collapses.

FIG. 13A and FIG. 13B are plan views for describing a fixing method of fixing an intermediate blade 280a according to a modification 4 and a fixing method of fixing an intermediate blade 280b according to the modification 5. FIG. 13A shows the intermediate blade 280a according to the modification 4, and FIG. 13B shows the intermediate blade 280b according to the modification 5 respectively. In FIG. 13A and FIG. 13B, only the intermediate blade and the housing body necessary for the description are shown, and other diaphragm blades, light leakage prevention blades and the like are omitted from the drawing.

As shown in FIG. 13A, a third fixing boss 283 is formed on one side of a third planar plate 282a of the intermediate blade 280a, and a third cam groove 285 is formed in the third planar plate 282a of the intermediate blade 280a such that the third cam groove 285 corresponds to a curved line/straight line which a moving path (trajectory) of the moving boss 130 of the diaphragm blade 100 positioned on a stage below the intermediate blade 280a draws. On the other hand, a third hole 403j is formed in a housing body 400a. In such a configuration, a third fixing boss 283 is inserted into the third hole 403j, and a moving boss 130 of the diaphragm blade 100 which is positioned on a stage below the intermediate blade 280a is inserted into the third cam groove 285. With such a configuration, the intermediate blade 280a can be substantially fixed to the housing body 400a (modification 4).

Further, as shown in FIG. 13B, a third fixing boss 283 and a fourth fixing boss 284 are formed on a third planar plate 282b of the intermediate blade 280b. On the other hand, a third hole 403j and a fourth hole 404j are formed also in a housing body 400b. In such a configuration, the third fixing boss 283 is inserted into the third hole 403j, and the fourth fixing boss 284 is inserted into the fourth hole 404j and hence, the intermediate blade 280b can be fixed to the housing body 400b (modification 5). The number of fixing bosses may be three or more.

According to the modification 5, the intermediate blade 280b can be fixed without introducing a third cam groove and hence, it is unnecessary to perform the restriction (substantially fixing) of the intermediate blade by the moving boss of other diaphragm blade by way of the third cam groove whereby a load imposed on an operation of other diaphragm blade can be reduced. Accordingly, it is possible to expect the realization of the more smooth driving of the blades while achieving further energy saving.

The invention claimed is:

1. An optical diaphragm device capable of changing an aperture diameter of a diaphragm aperture by advancing or retracting a plurality of blades with respect to an optical axis, the optical diaphragm device comprising:
a plurality of diaphragm blades each including: a first blade portion which is formed of a first planar plate and shields light incident on the aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;
a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade;
a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and
a housing body capable of housing the diaphragm blades, the light leakage prevention blades, and the drive ring, the optical diaphragm device includes a plurality of pairs each consisting of the diaphragm blade and the light leakage prevention blade, and a plurality of the first cam grooves each of which corresponds to each of the moving bosses are formed in the drive ring,
a plurality of pairs each consisting of a first hole and a second hole are formed in the housing body corresponding to the plurality of pairs each consisting of the diaphragm blade and the light leakage prevention blade, the first fixing boss and the second fixing boss being inserted into the pair of the first hole and the second hole respectively, the number of pairs each consisting of the first hole and the second hole being equal to the number of pairs each consisting of the diaphragm blade and the light leakage prevention blade,
a second cam groove is further formed in the light leakage prevention blade,
the moving boss of the diaphragm blade is inserted into the second cam groove of the light leakage prevention blade, and is inserted into the first cam groove of the drive ring, and
assuming a side where the second blade portion of the second planar plate of the light leakage prevention blade is positioned as viewed from the second fixing boss as one side, the light leakage prevention blade further has a light leakage prevention blade extending portion which extends toward an other side from the second fixing boss.

2. The optical diaphragm device according to claim 1, wherein in the case where the second direction is defined as an upward direction, the diaphragm blade out of the diaphragm blade and the light leakage prevention blade which form the pair, the light leakage prevention blade out of the diaphragm blade and the light leakage prevention blade which form the pair, the diaphragm blade out of the diaphragm blade and the light leakage prevention blade which form the succeeding pair positioned adjacently to the diaphragm blade and the light leakage prevention blade which form the pair, and the light leakage prevention blade out of the diaphragm blade and the light leakage prevention blade which form the succeeding pair are arranged in an overlapping manner in the upward direction in this order, and
in viewing the optical diaphragm device along the optical axis,
a portion of an outer profile of the diaphragm blade out of the diaphragm blade and the light leakage prevention blade which form the succeeding pair always overlaps with the light leakage prevention blade out of the diaphragm blade and the light leakage prevention blade which form the pair, and
in a state where the aperture diameter of the diaphragm aperture assumes a minimum value, a portion of the outer profile of the diaphragm blade out of the diaphragm blade and the light leakage prevention blade which form the succeeding pair overlaps with the light leakage prevention blade extending portion of the light leakage prevention blade out of the diaphragm blade and the light leakage prevention blade which form the pair.

3. The optical diaphragm device according to claim 1, wherein the diaphragm blade is formed of the first planar plate of an elongated shape having a longitudinal axis as a whole,
the first fixing boss is formed on one side of the first planar plate of the diaphragm blade in the longitudinal axis direction and a diaphragm blade extending portion is formed on an other side of the first planar plate of the diaphragm blade in the longitudinal axis direction,
the diaphragm blade extending portion has an inner periphery formed in a shape substantially equal to a shape of a portion of the diaphragm aperture in a state where the aperture diameter of the diaphragm aperture assumes a maximum value,
a portion of the diaphragm blade extending portion which is formed to be disposed on a more outer peripheral side than at least the inner periphery is always positioned outside a housing body inner periphery which is an inner periphery of the housing body or is always positioned outside a drive ring inner periphery which is an inner periphery of the drive ring, and
in viewing the optical diaphragm device along the optical axis,
at least a portion of the diaphragm blade extending portion of the diaphragm blade always overlaps with the light leakage prevention blade positioned on a side opposite to the first fixing boss with the optical axis sandwiched between the first fixing boss and the light leakage prevention blade as viewed from the first fixing boss of the diaphragm blade, and
in a state where the aperture diameter of the diaphragm aperture assumes a maximum value, a portion of the diaphragm blade extending portion of the diaphragm blade overlaps with the light leakage prevention blade extending portion of the light leakage prevention blade positioned on the opposite side.

4. The optical diaphragm device according to claim 1, wherein the diaphragm blade is formed of the first planar plate of an elongated shape having a longitudinal axis as a whole, the first fixing boss is formed on one side of the first planar plate of the diaphragm blade in the longitudinal axis direction and a diaphragm blade extending portion is formed on an other side of the first planar plate of the diaphragm blade in the longitudinal axis direction, the diaphragm blade extending portion has an inner periphery formed in a shape substantially equal to a shape of a portion of the diaphragm aperture in a state where the aperture diameter of the diaphragm aperture assumes a maximum value, and an engaging convex portion which is always positioned outside a housing body inner periphery which is an inner periphery of the housing body or is always outside a drive ring inner periphery which is an inner periphery of the drive ring and engages with the housing body inner periphery is further formed on the diaphragm blade extending portion.

5. A lens barrel in which the optical diaphragm device according to claim 1 and a lens are housed.

6. An imaging device or a projection device comprising: the optical diaphragm device according to claim 1.

7. An optical diaphragm device capable of changing an aperture diameter of a diaphragm aperture by advancing or retracting a plurality of blades with respect to an optical axis, the optical diaphragm device comprising:

a plurality of diaphragm blades each including: a first blade portion which is formed of a first planar plate and shields light incident on the aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;

a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade;

a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and a housing body capable of housing the diaphragm blades, the light leakage prevention blades, and the drive ring, wherein the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the first fixing boss and the second fixing boss being inserted into the pair of the first hole and the second hole respectively, the number of pairs each consisting of the first hole and the second hole being equal to the number of pairs each consisting of the diaphragm blade and the light leakage prevention blade, a second cam groove is further formed in the light leakage prevention blade, the moving boss of the diaphragm blade is inserted into the second cam groove of the light leakage prevention blade, and is inserted into the first cam groove of the drive ring, and the optical diaphragm device further comprises an intermediate blade disposed between the light leakage prevention blade and the diaphragm blade, in the case where the second direction is defined as an upward direction, the diaphragm blade out of the diaphragm blade and the light leakage prevention blade which form the pair, the light leakage prevention blade out of the diaphragm blade and the light leakage prevention blade which form the pair, the intermediate blade, the diaphragm blade out of the diaphragm blade and the light leakage prevention blade which form the succeeding pair positioned adjacently to the diaphragm blade and the light leakage prevention blade which form the pair, and the light leakage prevention blade out of the diaphragm blade and the light leakage prevention blade which form the succeeding pair are arranged in an overlapping manner in the upward direction in this order, and in viewing the optical diaphragm device along the optical axis, the intermediate blade and the light leakage prevention blade out of the diaphragm blade and the light leakage prevention blade which form the pair always overlap with each other, and the intermediate blade and the diaphragm blade out of the diaphragm blade and the light leakage prevention blade which form the succeeding pair always overlap with each other.

8. The optical diaphragm device according to claim 7, wherein the intermediate blade is fixed to the housing body in a state where the intermediate blade does not interfere with movement of the diaphragm blade and movement of the light leakage prevention blade.

9. An optical diaphragm device capable of changing an aperture diameter of a diaphragm aperture by advancing or retracting a plurality of blades with respect to an optical axis, the optical diaphragm device comprising:

a plurality of diaphragm blades each including: a first blade portion which is formed of a first planar plate and shields light incident on the aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;

a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade;

a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and a housing body capable of housing the diaphragm blades, the light leakage prevention blades, and the drive ring, wherein the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the first fixing boss and the second fixing boss being inserted into the pair of the first hole and the second hole respectively, the number of pairs each consisting of the first hole and the second hole being equal to the number of pairs each consisting of the diaphragm blade and the light leakage prevention blade, a second cam groove is further formed in the light leakage prevention blade, the moving boss of the diaphragm blade is inserted into the second cam groove of the light leakage prevention blade, and is inserted into the first cam groove of the drive ring, and the optical diaphragm device further comprises an intermediate blade disposed between the light leakage prevention blade and the diaphragm blade, in the case where the second direction is defined as an upward direction, the diaphragm blade out of the diaphragm blade and the light leakage prevention blade which form the pair, the light leakage prevention blade out of the diaphragm blade and the light leakage prevention blade which form the pair, the intermediate blade, the diaphragm blade out of the diaphragm blade and the light leakage prevention blade which form the succeeding pair positioned adjacently to the diaphragm blade and the light leakage prevention blade which form the pair, and the light leakage prevention blade out of the diaphragm blade and the light leakage prevention blade which form the succeeding pair are arranged in an overlapping manner in the upward direction in this order, and in viewing the optical diaphragm device along the optical axis, the intermediate blade and the light leakage prevention blade out of the diaphragm blade and the light leakage prevention blade which form the pair always overlap with each other, and the intermediate blade and the diaphragm blade out of the diaphragm blade and the light leakage prevention blade which form the succeeding pair always overlap with each other, wherein the diaphragm blade is formed of the first planar plate of an elongated shape having a longitudinal axis as a whole, the first fixing boss is formed on one side of the first planar plate of the diaphragm blade in the longitudinal axis direction and a diaphragm blade extending portion is formed on an other side of the first planar plate of the diaphragm blade in the longitudinal axis direction, the diaphragm blade extending portion has an inner periphery formed in a shape substantially equal to a shape of a portion of the diaphragm aperture in a state where the aperture diameter of the diaphragm aperture assumes a maximum value, a portion of the diaphragm blade extending portion which is formed to be disposed on a more outer peripheral side than at least the inner periphery is always positioned outside a housing body inner periphery which is an inner periphery of the housing body or is always positioned outside a drive ring inner periphery which is an inner periphery of the drive ring, and in viewing the optical diaphragm device along the optical axis, in a state where the aperture diameter of the diaphragm aperture assumes a minimum value, a portion of the diaphragm blade extending portion of the diaphragm blade overlaps from above with the light leakage prevention blade positioned on a side opposite to the first fixing boss with the optical axis sandwiched between the first fixing boss and the light leakage prevention blade as viewed from the first fixing boss of the diaphragm blade, and in a process of transition of the aperture diameter of the diaphragm aperture from the minimum value to a maximum value, the portion of the diaphragm blade extending portion of the diaphragm blade overlaps with the intermediate blade positioned on a side opposite to the first fixing boss with the optical axis sandwiched between the first fixing boss and the intermediate blade as viewed from the first fixing boss of the diaphragm blade.

* * * * *